United States Patent
Grossman et al.

(10) Patent No.: US 10,365,797 B2
(45) Date of Patent: Jul. 30, 2019

(54) GROUP MEMBERSHIP CONTENT PRESENTATION AND AUGMENTATION SYSTEM AND METHOD

(71) Applicants: Andrew Grossman, Hopkins, MN (US); Kenneth F. Krutsch, Minnetonka, MN (US); Richard Monson-Haefel, Edina, MN (US)

(72) Inventors: Andrew Grossman, Hopkins, MN (US); Kenneth F. Krutsch, Minnetonka, MN (US); Richard Monson-Haefel, Edina, MN (US)

(73) Assignee: Ambient Consulting, LLC, Minnetonka, MN (US)

( * ) Notice: Subject to any disclaimer, the term of this patent is extended or adjusted under 35 U.S.C. 154(b) by 1292 days.

(21) Appl. No.: 13/947,016

(22) Filed: Jul. 19, 2013

(65) Prior Publication Data

US 2014/0282192 A1 Sep. 18, 2014

Related U.S. Application Data

(63) Continuation-in-part of application No. 13/832,744, filed on Mar. 15, 2013, now Pat. No. 9,886,173, and a continuation-in-part of application No. 13/834,347, filed on Mar. 15, 2013, now Pat. No. 9,460,057, which is a continuation-in-part of application No. 13/832,177, filed on Mar. 15, 2013, now Pat. No. (Continued)

(51) Int. Cl.
*G06F 17/30* (2006.01)
*G06F 3/0484* (2013.01)
*G06F 16/28* (2019.01)

(52) U.S. Cl.
CPC .......... *G06F 3/0484* (2013.01); *G06F 16/285* (2019.01)

(58) Field of Classification Search
CPC .................. G06F 3/0484; G06F 17/30598
USPC ............................................ 707/737
See application file for complete search history.

(56) References Cited

U.S. PATENT DOCUMENTS

| | | |
|---|---|---|
| 7,673,248 B2 | 3/2010 | Narayanaswami |
| 8,234,586 B2 | 7/2012 | Glein |

(Continued)

OTHER PUBLICATIONS

Dec. 17, 2015 USPTO Office Action (U.S. Appl. No. 13/834,347)—Our Matter 4929.

(Continued)

*Primary Examiner* — Hicham Skhoun
(74) *Attorney, Agent, or Firm* — Tysver Beck Evans PLLC

(57) ABSTRACT

A computerized system and method are presented that creates implicit content on a mobile device by monitoring and recording input from sensors on the device. Metadata from the implicit content and from user-created content is then analyzed for the purpose of event identification. Using the metadata and event identification, the content is created into clusters, which can be confirmed by the user as actual events. Events can then be grouped according to metadata and event information into a presentation grouping. Users can also be associated with organizations, allowing the sharing of content and event definitions between the organization and its member users. Users can create ad hoc organizations with a particular subset of other users, which simplifies the creation of event meta data and content sharing with other users in the ad hoc organization.

7 Claims, 26 Drawing Sheets

Related U.S. Application Data 9,626,365, said application No. 13/832,744 is a continuation-in-part of application No. 13/832,177, filed on Mar. 15, 2013, now Pat. No. 9,626,365.

(56) References Cited

U.S. PATENT DOCUMENTS

| | | | |
|---|---|---|---|
| 8,250,070 | B1 | 8/2012 | He et al. |
| 8,281,027 | B2 | 10/2012 | Martinez et al. |
| 8,327,284 | B2 | 12/2012 | Marusich et al. |
| 8,515,460 | B2 | 8/2013 | Greenberg |
| 8,645,855 | B2 | 2/2014 | Marusich et al. |
| 8,745,057 | B1 | 6/2014 | Li |
| 8,745,617 | B1 | 6/2014 | Stekkelpak et al. |
| 8,856,375 | B2 | 10/2014 | Martinez et al. |
| 8,879,890 | B2 | 11/2014 | Luo et al. |
| 8,963,962 | B2 | 2/2015 | Ubillos |
| 9,009,159 | B2 | 4/2015 | Bernhardt et al. |
| 9,009,596 | B2 | 4/2015 | Ortiz |
| 9,043,276 | B2 | 5/2015 | Kiilerich et al. |
| 9,460,057 | B2 | 10/2016 | Grossman |
| 2004/0064351 | A1 | 4/2004 | Mikurak |
| 2004/0177149 | A1* | 9/2004 | Zullo ............ G06Q 30/02 709/228 |
| 2004/0210480 | A1 | 10/2004 | Muller |
| 2006/0178918 | A1 | 8/2006 | Mikurak |
| 2007/0136773 | A1 | 6/2007 | O'neil et al. |
| 2008/0032739 | A1 | 2/2008 | Hoodbhoy et al. |
| 2008/0109718 | A1 | 5/2008 | Narayanaswami |
| 2008/0155627 | A1 | 6/2008 | O'connor et al. |
| 2008/0195698 | A1 | 8/2008 | Stefanovic et al. |
| 2009/0144325 | A1 | 6/2009 | Chastagnol et al. |
| 2009/0249249 | A1 | 10/2009 | Glein |
| 2009/0259654 | A1* | 10/2009 | Yamamoto ...... G06F 17/30286 |
| 2009/0313679 | A1 | 12/2009 | Mcafee |
| 2009/0325602 | A1 | 12/2009 | Higgins et al. |
| 2009/0327288 | A1 | 12/2009 | Silverman et al. |
| 2009/0328087 | A1 | 12/2009 | Higgins et al. |
| 2010/0082239 | A1 | 4/2010 | Hardy et al. |
| 2010/0082624 | A1* | 4/2010 | Martin ............ G06F 17/30041 707/737 |
| 2010/0088297 | A1 | 4/2010 | Kiilerich |
| 2010/0175001 | A1 | 7/2010 | Lazarus et al. |
| 2010/0251101 | A1 | 9/2010 | Haussecker et al. |
| 2011/0167061 | A1 | 7/2011 | Li et al. |
| 2011/0167357 | A1* | 7/2011 | Benjamin ........ H04M 1/72572 715/753 |
| 2011/0167462 | A1 | 7/2011 | O'onnor et al. |
| 2011/0246890 | A1 | 10/2011 | Mellamphy et al. |
| 2011/0249953 | A1* | 10/2011 | Suri .................. G11B 27/034 386/239 |
| 2011/0251868 | A1 | 10/2011 | Mikurak |
| 2012/0042036 | A1 | 2/2012 | Lau et al. |
| 2012/0054660 | A1 | 3/2012 | Marusich et al. |
| 2012/0116559 | A1 | 5/2012 | Davis et al. |
| 2012/0117473 | A1* | 5/2012 | Han .................. G11B 27/034 715/723 |
| 2012/0173358 | A1 | 7/2012 | Soroca et al. |
| 2012/0210220 | A1 | 8/2012 | Pendergast et al. |
| 2012/0213493 | A1 | 8/2012 | Luo et al. |
| 2012/0224743 | A1 | 9/2012 | Rodriguez et al. |
| 2012/0239645 | A1 | 9/2012 | Li et al. |
| 2012/0240142 | A1 | 9/2012 | Rose |
| 2012/0259722 | A1 | 10/2012 | Mikurak |
| 2013/0018897 | A1 | 1/2013 | Martinez et al. |
| 2013/0132836 | A1 | 5/2013 | Ortiz |
| 2013/0144847 | A1* | 6/2013 | Spurlock ......... G06F 17/30876 707/692 |
| 2013/0159868 | A1 | 6/2013 | Marusich et al. |
| 2013/0198602 | A1 | 8/2013 | Kokemohr |
| 2013/0238724 | A1 | 9/2013 | Cunningham |
| 2013/0238990 | A1 | 9/2013 | Ubillos et al. |
| 2013/0239031 | A1 | 9/2013 | Ubillos et al. |
| 2013/0239055 | A1 | 9/2013 | Ubillos et al. |
| 2013/0239063 | A1 | 9/2013 | Ubillos et al. |
| 2013/0275880 | A1 | 10/2013 | Bachman et al. |
| 2013/0275886 | A1 | 10/2013 | Haswell et al. |
| 2013/0343618 | A1* | 12/2013 | Zomet ............. G06K 9/00677 382/124 |
| 2014/0019446 | A1 | 1/2014 | He et al. |
| 2014/0068433 | A1 | 3/2014 | Chitturi |
| 2014/0101149 | A1* | 4/2014 | Winters ......... G06F 17/30345 707/736 |
| 2014/0122471 | A1 | 5/2014 | Houston et al. |
| 2014/0140675 | A1 | 5/2014 | De Sa et al. |
| 2014/0172863 | A1 | 6/2014 | Imbruce et al. |
| 2014/0181110 | A1 | 6/2014 | Imbruce et al. |
| 2014/0236709 | A1 | 8/2014 | Aguayo et al. |
| 2014/0281929 | A1 | 9/2014 | Grossman et al. |
| 2014/0282179 | A1 | 9/2014 | Grossman et al. |
| 2015/0213001 | A1 | 7/2015 | Levy et al. |
| 2015/0289022 | A1 | 10/2015 | Gross |
| 2016/0012066 | A1 | 1/2016 | Ning et al. |
| 2017/0180961 | A1 | 6/2017 | Gauglitz et al. |

OTHER PUBLICATIONS

Feb. 17, 2016 USPTO Office Action (U.S. Appl. No. 13/832,744)—Our Matter 4985.
Jun. 2, 2015 USPTO Office Action (U.S. Appl. No. 13/832,744)—Our Matter 4985.
Sep. 23, 2015 USPTO Office Action (U.S. Appl. No. 13/832,177)—Our Matter 4967.
Becker, Hila; Naaman, Mor; and Gravano, Luis; "Event Identification in Social Media," Twelfth International Workshop on the Web and Database (WebDB 2009), Providence, RI, USA.
"Yahoo Travel; Trip Planner; FAQ", Downloaded from the Internet, http://travel.yahoo.com/trip?action=faq, on Feb. 22, 2013.
Oct. 4, 2016 USPTO Office Action (U.S. Appl. No. 13/832,744)—Our Matter 4985.
Jun. 22, 2016 USPTO Office Action (U.S. Appl. No. 13/832,177)—Our Matter 4967.
Apr. 21, 2017 USPTO Office Action (U.S. Appl. No. 13/832,744)—Our Matter 4985.
Apr. 19, 2018 USPTO Office Action (U.S. Appl. No. 15/682,776)—Our Matter 5601.
May 10, 2018 USPTO Office Action (U.S. Appl. No. 15/475,867)—Our Matter 5553.

* cited by examiner

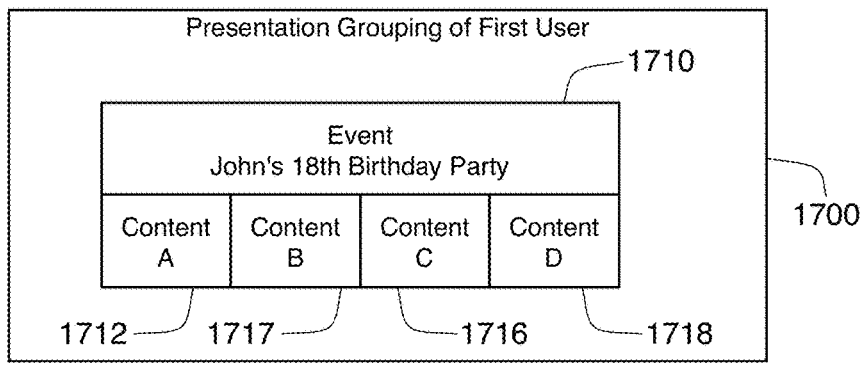
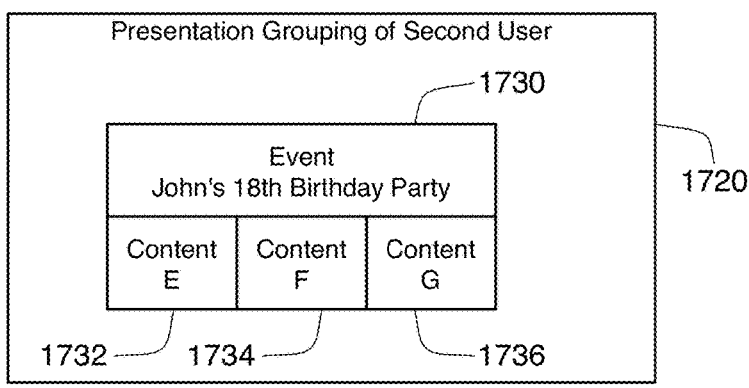
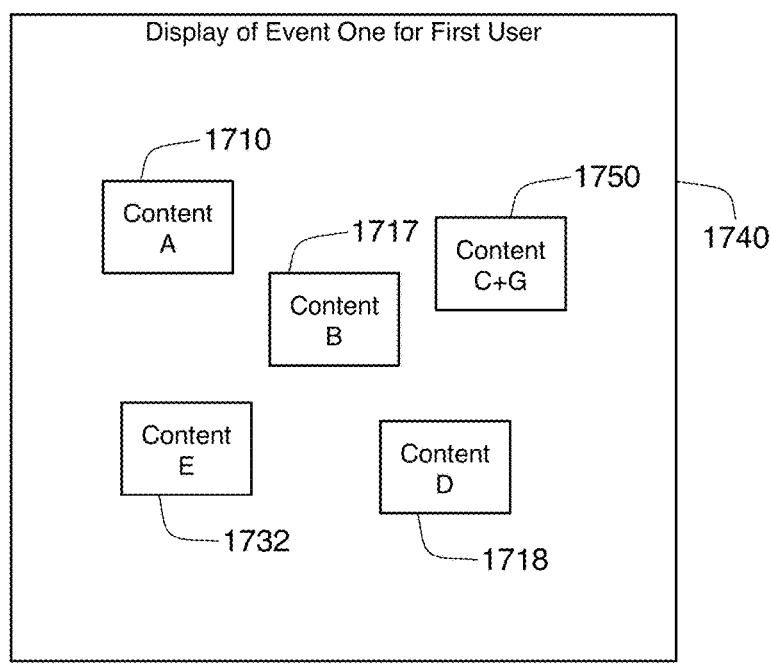
Fig. 17

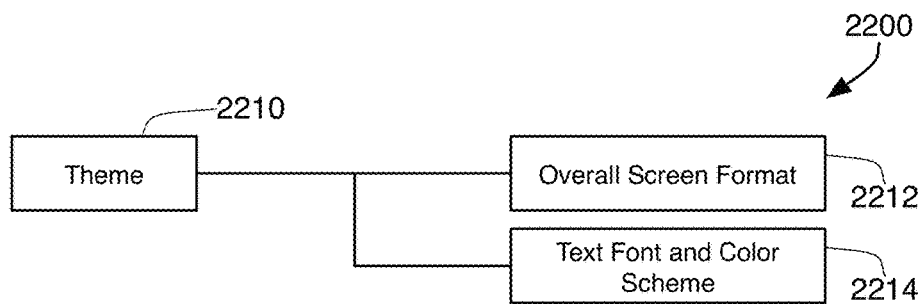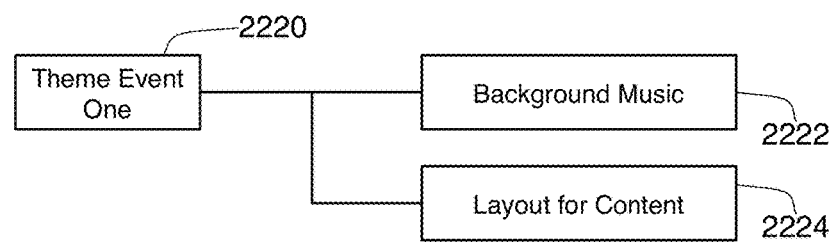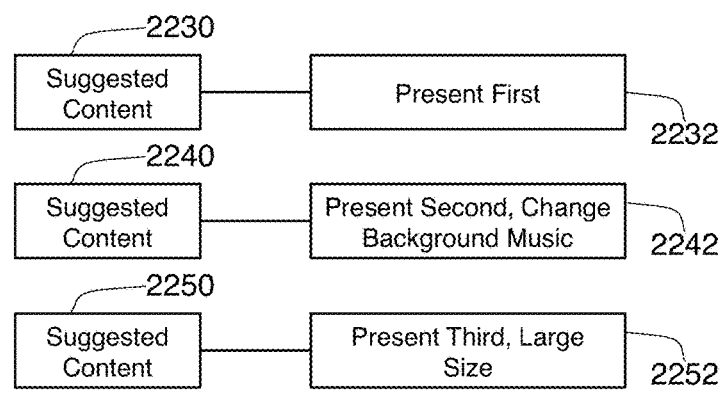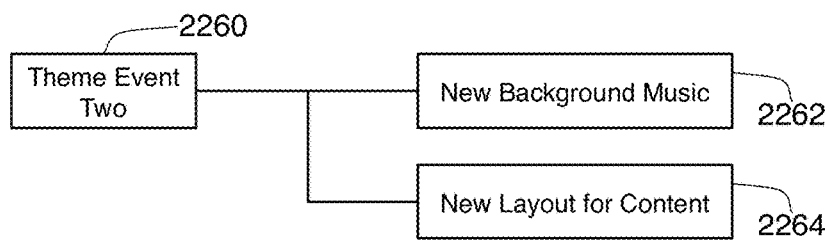
Fig. 22

GROUP MEMBERSHIP CONTENT PRESENTATION AND AUGMENTATION SYSTEM AND METHOD

CROSS REFERENCE TO RELATED APPLICATION

This application is a continuation-in-part of U.S. patent application Ser. No. 13/832,744 (the '744 application), filed Mar. 15, 2013, and is also a continuation-in-part of U.S. patent application Ser. No. 13/834,347 (the '347 application), filed Mar. 15, 2013. Both the '744 application and the '347 application are continuation-in-part applications of U.S. patent application Ser. No. 13/832,177, filed Mar. 15, 2013. All of the above-referenced applications are hereby incorporated by reference.

FIELD OF THE INVENTION

The present application relates to the field of computerized systems that organize and display media content.

SUMMARY

An embodiment of the present invention creates implicit content on a mobile device by monitoring and recording input from sensors on the device. This embodiment also analyzes metadata from the implicit content and metadata from explicit content created by a user for the purpose of creating content clusters, which are confirmed by the user as actual events. Events can then be grouped according to metadata and event information into a presentation grouping. Membership in a group or organization can be used to cluster content based upon predefined events associated with the organization.

Presentation groupings can be presented using an interface having a timeline, map, and content sections. Presentation groupings can include augmentation content, including external augmentation content taken from the Internet based on the location and time information in the displayed event. External augmentation can be stored with the event data and formatted according to user desires. Individuals viewing a presentation grouping can add additional augmentation that is stored with the event data. Furthermore, the system can automatically augment event data using data from other users of the system that participated in the same event. External augmentation can also be provided according to group membership. Metadata and content from newly created events can be shared with other members of a user's group.

Themes can be developed and associated with a presentation grouping. Each theme can have pre-defined theme events. Theme events can be planned for the future, or can be used to identify existing media content already created by the user. Future theme events can prompt a user to take content at events that will fit into the theme. Themes include formatting that can be tied to the theme events, allowing user created content to be inserted into professional designed, story-based themes for presentation to viewers. Themes can be created by organizations and be made available to members of the organization. The organization's themes can include content provided by the organization or by other members of the organization.

BRIEF DESCRIPTION OF THE DRAWINGS

FIG. 17 is a schematic diagram showing merging of content for a single event from multiple users.

FIG. 22 is a schematic diagram showing the relationship between formatting instructions and theme content.

DETAILED DESCRIPTION

System Overview

Figure 1:
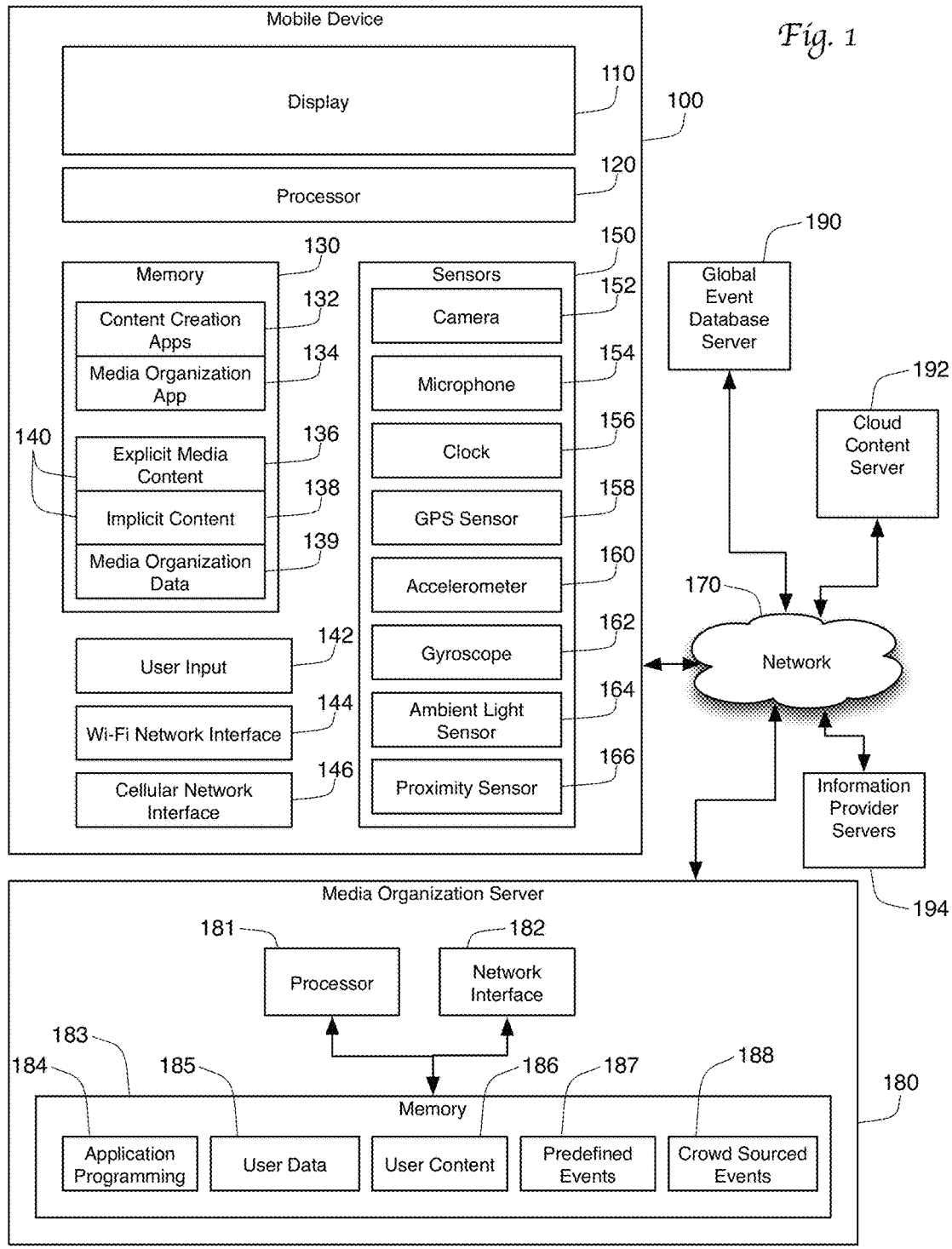
FIG. 1 is a schematic diagram showing a mobile device and a plurality of servers communicating over a network.

FIG. 1 shows a mobile device 100 utilizing one embodiment of the present invention. The mobile device 100 can communicate over a wide area network 170 with a plurality of computing devices. In FIG. 1, the mobile device 100 communicates with a media organization server 180, a global event database server 190, one or more cloud content servers 192, and a third-party information provider server 194.

The mobile device 100 can take the form of a smart phone or tablet computer. As such, the device 100 will include a display 110 for displaying information to a user, a processor 120 for processing instructions and data for the device 100, a memory 130 for storing processing instructions and data, and one or more user input interfaces 142 to allow the user to provide instructions and data to the mobile device 100. The display 110 can be use LCD, OLED, or similar technology to provide a color display for the user. In some embodiments, the display 110 incorporates touchscreen capabilities so as to function as a user input interface 142. The processor 120 can be a general purpose CPU, such as those provided by Intel Corporation (Mountain View, Calif.) or Advanced Micro Devices, Inc. (Sunnyvale, Calif.), or a mobile specific processor, such as those designed by ARM Holdings (Cambridge, UK). Mobile devices such as device 100 generally use specific operating systems designed for such devices, such as iOS from Apple Inc. (Cupertino, Calif.) or ANDROID OS from Google Inc. (Menlo Park, Calif.). The operating systems are stored on the memory 130 and are used by the processor 120 to provide a user interface for the display 110 and user input devices 142, handle communications for the device 100, and to manage applications (or apps) that are stored in the memory 130. The memory 130 is shown in FIG. 1 with two different types of apps, namely content creation apps 132 and a media organization app 134. The content creation apps 132 are apps that create explicit media content 136 in the memory 130, and include video creation apps, still image creation apps, and audio recording apps. The media organization app 134 creates implicit content 138. The media organization app 134 is responsible for gathering the different types of explicit media content 136 and the implicit content 138 (referred to together as content 140), analyzing the content 140, and then organizing the content 140 into clusters, events, and presentation groupings that are stored in media organization data 139 as described below.

The mobile device 100 communicates over the network 170 through one of two network interfaces, namely a Wi-Fi network interface 144 and a cellular network interface 146. The Wi-Fi network interface 144 connects the device 100 to a local wireless network that provides connection to the wide area network 170. The Wi-Fi network interface 144 preferably connects via one of the Institute of Electrical and Electronics Engineers' (IEEE) 802.11 standards. In one embodiment, the local network is based on TCP/IP, and the Wi-Fi network interface includes a TCP/IP protocol stack. The cellular network interface 146 communicates over a cellular data network. The provider of the cellular data network then provides an interface to the wide area network 170. In one embodiment, the wide area network 170 is the Internet.

The mobile device 100 uses sensors 150 for a variety of purposes on the device 100. In the present embodiment, the sensors 150 provide the means to create media content 140. The content creation apps 132 respond to signals from the user input 142 to capture media content 136 using the camera sensor 152 and the microphone 154. These types of media content 136 are known as "explicit media content" because the user has explicitly requested that the mobile device 100 capture and store this media content 136. For instance, a user might instruct a photo taking app 132 to take a still photograph using the camera 152, or to stitch together a stream of input from the camera sensor 152 into a panorama image that is stored as explicit media content 136. A movie app 132 might record input from the camera 152 and microphone 154 sensors as a video file 136. Or a voice memo app 132 might record input from the microphone sensor 154 to create an audio media content file 136. In each case, these content creation apps 132 respond to an explicit request from a user to create the media content 136. In most cases, the explicit media content 136 is stored as a file or a data record in the memory 130 of the mobile device 100. This file or data record includes both the actual content recorded by the sensors 150 and metadata associated with that recording. The metadata will include the date and time at which the media content 136 was recorded, as determined by the clock 156. Frequently, the metadata also includes a geographic location where the media content 136 was created. The geographic location can be determined from the GPS sensor 158, or by using other location identifying techniques such as identifying nearby Wi-Fi networks using the Wi-Fi Network Interface 144, or through nearby cell tower identification using the cellular network interface 146. Some content creation apps 132 will include facial recognition capabilities in order to tag the identity of individuals within a photo or video file 136. Other apps 132 will allow a user a manually tag their files 136 so as to identify the individuals (or "participants") portrayed in those media files 136. These identity tags can then be added to the metadata stored with the media content file 136 in memory 130.

In some embodiments, the explicit media content 136 will be stored remotely on a cloud content server 192. For example, all photographs taken by the camera 152 may be stored in memory 130 as explicit media content 136 and may also be transmitted over one of the network interfaces 144, 146 to the cloud content server 192. The locally stored explicit media content 136 may be temporary in nature, with permanent storage provided on the cloud content server 192. In some circumstances, a third party (such as the FLICKR service provided by Yahoo!. Inc. of Sunnyvale, Calif.) will provide the cloud content server 192.

The media organization app 134 creates implicit content 138 by monitoring the sensors 150 on the mobile device 100 and storing related data as implicit content 138 when it monitors an interesting change in the sensors 150. For instance, the media organization app 134 might be monitoring the GPS sensor 158 and accelerometer 160 during a family driving vacation from Chicago, Ill. to Yellowstone National Park in Wyoming. The accelerometer 160 can indicate when the family car stops, and then determine the location of the mobile device 100 using the GPS sensor 158. By monitoring the accelerometer 160 and the GPS sensor 158 (at least periodically), the media organization app 134 can determine that the car was stopped during this family vacation for 3 hours, 15 minutes in Wall, S. Dak. This data could be stored as implicit content 138 in the memory 130.

When the app 134 creates this implicit content 138, it may also uses one of the network interfaces 144, 146 to obtain additional information about this implicit content 138. For example, the app 134 may contact a global event database server 190 that contains information about a great number of events (or "occurrences"). This type of database server 190, which is provided by several third parties over the Internet 170, allows users to specify a geographic location and a time, and the server 190 will respond with information about occurrences happening near that location around that time. The information returned from the global event database server will generally include a title for the occurrence, a description for that occurrence, a time period during which that occurrence takes place, and an exact physical location for that occurrence. For example, during the stop in Wall, S. Dak., the app 134 may inquire whether there are any events happening in Wall at the time the vehicle was stopped. The event database server 190 may indicate that at this time, a parade was happening in downtown Wall. In other embodiments, the media organization server 180 will include its own database of predefined events 187. In still further embodiments, predefined events 187 could be created by other users of the media organization server 180 that have elected to share their event data 187 with the user of the mobile device 100. In some embodiments, event data 187 relevant to a user can be periodically downloaded and stored locally within the mobile device 100. The downloaded event data 187 can pass through the media organization server 180, or alternatively can be transmitted directly from one user to another through a peer-to-peer sharing arrangement. Downloading this event data 187 to the mobile device 100 allows the app 134 to access this event data 187 at a later time without requiring network access to the media organization server 180.

This data 187 can also be queried by the app 134 to identify events related to the content 136, 138. The app 134 may also make inquiries from different information provider servers 194, such as a server 194 that provides weather information for a particular geographic location. By acquiring this information from external database sources 190, 194, the media organization app 134 would be able to create implicit content 138 indicating that from 12:15 to 3:30 pm on Jul. 4, 2013, the user of the mobile device 100 stopped in Wall, S. Dak. and witnessed a parade in sunny, 92-degree weather.

The media organization app 134 can take advantage of any of the sensors 150 on the mobile device 100, including the camera 152, microphone 154, clock 156, GPS sensor 158, accelerometer 160, gyroscope 162, ambient light sensor 164, and proximity sensor 166. The app 134 can define monitoring modes that determine the extent to which it monitors the various sensors 150. For instance, in one monitoring mode the app 134 could provide reverse geocoding by periodically (or continually) recording a location for the user from the GPS sensor 158. In another mode, the app 134 could monitor the accelerometer to indicate when the user is moving or has stopped moving. In a third mode, the app 134 could periodically monitor the microphone 154. If no interesting noises were detected, the app 134 would wait for the next interval before it again monitored the microphone 154. If interesting noises were detected (e.g., noises that were characteristic of human voices), the app 134 could record a small amount of the conversation and record it as implicit content 138 in memory 130, along with the time and location at which the conversation was recorded. In a fourth mode, the use of another app, such as one of the content creation apps 132, triggers the creation of an implicit content file 138. For instance, the use of a photo or movie app 132 may cause the media organization app 134 to record the GPS location, the current weather, and the current event, if any, noted by the global event database server 190. In addition, the app 132 in this fourth mode may record sounds from the microphone 154 to capture conversations between the user of the mobile device 100 and her photography subjects. These conversations would be stored as implicit content 138 in memory 130.

When requested by the user, the media organization app 134 collects the content 140 from the memory 130 (and from cloud content servers 192) and organizes the content 140 into content clusters. Content clusters are groups of content 140 that are grouped together as belonging to a particular occurrence or event. As described below, content clusters are presented to the user for modification and verification, after which the content groupings are referred to as user-verified events. Events may involve numerous elements of content 140, or may involve only a single element of content 140. In the preferred embodiment, the content clusters and events are stored in media organization data 139. The media organization data 139 may also contain event definitions and calendar items that have been downloaded to the mobile device 100, either through a peer-to-peer sharing system or via download from the media organization server 180. Sharing of event metadata and calendar items between users is described in more detail below. In addition, the content clusters and events could be stored on a media organization server 180 accessible by the mobile device 100 over the network 170.

The media organization server 180 contains a programmable digital processor 181, such as a general purpose CPU manufactured by Intel Corporation (Mountain View, Calif.) or Advanced Micro Devices, Inc. (Sunnyvale, Calif.). The server 180 further contains a wireless or wired network interface 182 to communicate with remote computing devices, such as mobile device 100, over the network 170. The processor 181 is programmed using a set of software instructions stored on a non-volatile, non-transitory, computer readable memory 183, such as a hard drive or flash memory device. The software typically includes operating system software, such as LINUX (available from multiple companies under open source licensing terms) or WINDOWS (available from Microsoft Corporation of Redmond, Wash.).

The processor 181 performs the media organization functions of server 180 under the direction of application programming 184 stored in memory 183. Each user of the server 180 is separately defined and identified in the user data 185. The media organization app 134 can assist the user in creating an account on the media organization server 180. The account can require a username and password to access user content 186 that is stored on the server 180 on behalf of the users identified in data 185. The media organization server 180 can operate behind the media organization app 134, meaning that the user of the mobile device 100 accesses the server 180 through the user interface provided by the app 134. In addition, the media organization server 180 can provide a web-based interface to the user content 186, allowing a user to access and manipulate the user content 186 on any computing device with web access to the Internet 170. This allows users to organize their user content 186 and format presentations of that data 186 via any web browser.

As explained above, the media organization server 180 can include predefined event information 187 that is made available to the app 134. These predefined events 187 can be upcoming global events applicable to a broad range of users. In other embodiments, users create their own predefined events 187 (such as by uploading or sharing information from a personal calendar) that are then made available only to that user or to specific users who are invited to share that event information 187. In yet another embodiment, an organization can create its own predefined events 187 and make that event information 187 available to those users that are associated with that organization. Information about organizations and their membership can also be stored in the memory 183 of the media organization server 180.

In addition, because the media organization server 180 contains information about content clusters and events created by a number of users, the server 180 can create an additional database 188 of past occurrences and events that could be useful to the media organization app 134 when clustering media. For instance, a first user could cluster media about a parade that they witnessed between 12:30 and 1:30 pm in Wall, S. Dak. on Jul. 4, 2013. The user could verify this cluster as a user-verified event, and could add a title and description to the event. This data would then be uploaded to the server 180 and stored as a crowd-sourced event 188. At a later time, a mobile device 100 of a second user could make an inquiry to the media organization server 180 about events that occurred in downtown Wall, S. Dak. at 1 pm on Jul. 4, 2013. The server 180 could identify this time and location using the event database information 188 created by the previous user, and return the title and description of the event to the mobile device 100 of the second user. In effect, the media organization server 180 could become a crowd-sourced event database server providing information similar to that provided by server 190 (except likely limited to past and not future events).

Database

Figure 2:
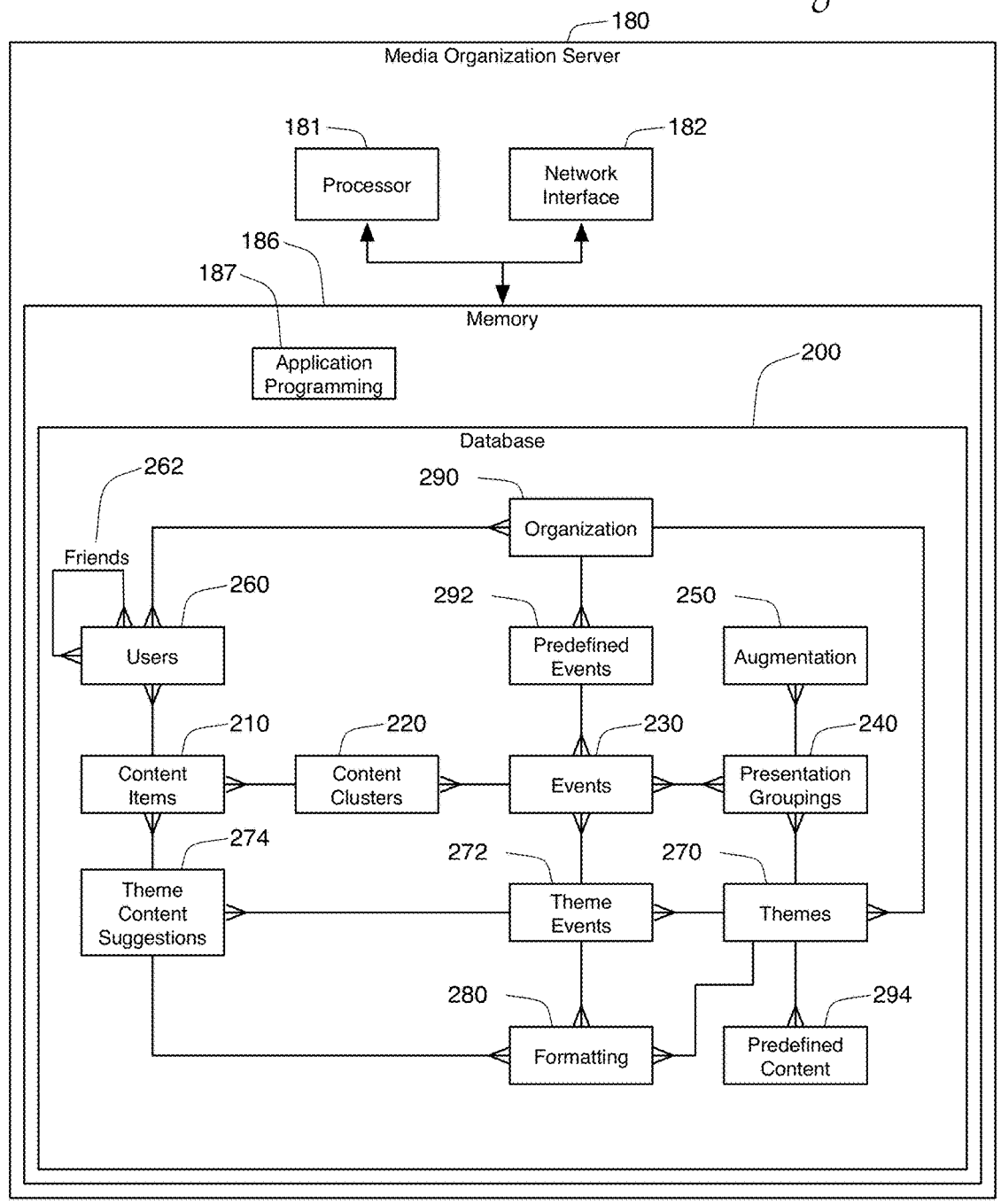
FIG. 2 is a schematic diagram showing a database used by a media organization server of the present invention.

FIG. 2 shows media organization server 180 with more detail provided related to data stored in memory 183. In FIG. 2, user data 185, user content 186, predefined events 187, crowd sourced events 188, and information about organizations and membership are all stored in a computerized, structured database 200. The database 200 is stored in the memory 183 of the media organization server 180 as structured data (such as separate tables in a relational database, or as database objects in an object-oriented database environment). Database programming stored on the memory of the media organization server 180 directs the processor 181 to access, manipulate, update, and report on the data in the database 200. FIG. 2 shows the database 200 with tables or objects for content items 210, content clusters 220, user-confirmed events 230, presentation groupings 240, augmentations 250, and users 260. Augmentations 250 are additional content added to a presentation grouping 240, as explained below in connection with FIGS. 12-19. In some embodiments, user content 210 from a first user can act as augmentation content 250 for a second user without requiring that the first user's content 210 be copied into the augmentation content 250 database structure. Although the database 200 is described in this document in connection with the data stored and maintained by the media organization server 180, the data structures shown as part of the database 200 in FIG. 2 could also be used to store and organize the media organization data 139 in the memory 130 of the mobile device 100.

Relationships between the database entities are represented in FIG. 2 using crow's foot notation. For example, FIG. 2 shows that presentation groupings 240 are associated with a plurality of user-confirmed events 230, which are themselves associated with one or more content clusters 220 that contain one or more content items 210. Alternatively, content clusters 220 and events 230 can share a database entity definition, with the difference between the two types of data 220, 230 being reflected in a field value indicating whether the content cluster 220 had been affirmed by a user and could now be viewed as a user-confirmed event 230. Associations or relationships between the database entities shown in FIG. 2 can be implemented through a variety of known database techniques, such as through the use of foreign key fields and associative tables in a relational database model. In FIG. 2, associations are shown directly between two database entities, but entities can also be associated through a third database entity. For example, a user database entity 260 is directly associated with one or more content items 210, and through that relationship the user entity 260 is also associated with user confirmed events 230 and presentation groupings 240.

The user content database also includes an entity for themes 270, theme events 272, theme content suggestions 274, and formatting instructions 280. As explained in further detail below in connection with FIGS. 20-26, theme database entities 270 help define themes for presentation groupings 240. Each theme 270 may relate to a life event, such as a wedding, or any other experience that is commonly shared by people, such as a family vacation or a tour of duty in the army. Themes 270 can be defined in the database as having particular theme events 272 (such as a "groom's dinner" theme event 272 for a wedding theme 270). Each of these theme events 272 may, in turn, include theme content suggestions 274, such as "take a video of the toasts that occur after the groom's dinner." Themes 270, theme events 272, and theme content suggestions 274 are described in more detail below. Themes 270 in the database 200 can be directly associated with formatting instructions 280 that are used to format the presentation grouping 240. For instance, if a presentation grouping 240 were association with a theme 270, the interfaces used to present that presentation grouping 240 to a user would be formatted according to formatting instructions 280 associated with that theme 270. The formatting instructions may be as simple as specifying fonts, colors, background images, and/or background music. Preferably, however, the formatting instructions 280 will also specify formatting and presentation specifics for theme events 272 and content items 210 associated with theme content suggestions 274.

Figure 3:
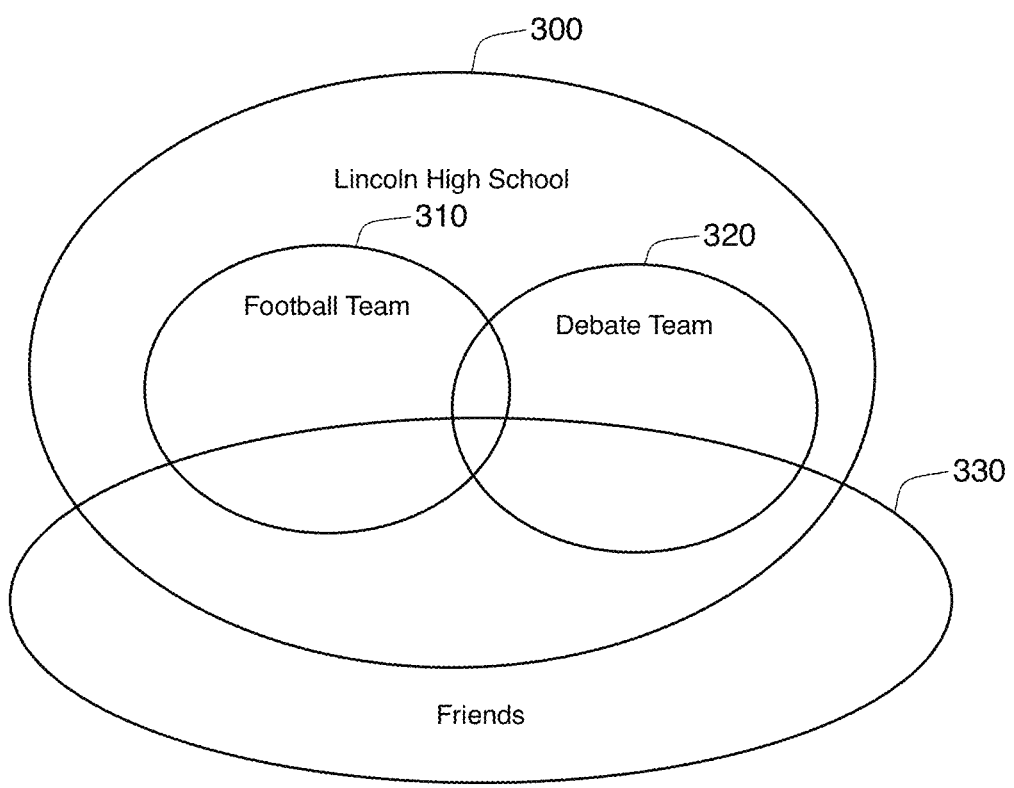
FIG. 3 is a Venn diagram showing the relationship between three organizations and a friend grouping.

The database 200 may also include data defining one or more organizations 290. These organizations 290 are each associated with a plurality of users 260 that are members of that organization 290. For instance, one organization 290 could be a particular public high school, which is associated with the students and teachers 260 of that school. Each individual 260 may be associated in the database 200 with a plurality of organizations 290, as indicated by the crow's foot notation in FIG. 2. Some of these organizations 290 may be subsets of other organizations 290, as shown in FIG. 3. For example, a student 260 may be a student at a high school 300, a member of that school's football team 310, and a member of the school's debate team 320. As shown in FIG. 3, all members of the football team 310 and the debate team 320 are also members of the high school organization 300.

Each of these school organizations 300, 310, 320 may have a separate calendar of predefined events 187, which are shown in FIG. 2 as predefined events database entities 292 that are associated with the organization database entity 290. By associating users 260 with organizations 290 in the database, it is possible to use the predefined events 292 created by that organization 290 to help organize the user's content items 210 into events 230. For instance, if the media organization server 180 knows that a user 260 is a member of the debate team 290 (element 320 in FIG. 3) that has a meet in Northfield, Minn. on a particular day in May (as indicated by the predefined event 292 for that organization 290), the server 180 will recommend that all content created by the user on that day at that geo-location (in Northfield, Minn.) be considered to be content for the predefined debate meet event 292. Each organization 290 can also develop themes 270 for that organization 290, and even create predefined content 294 for that theme. For example, Lincoln High School 300 can create a predefined event theme 292 for their senior prom. The high school 300 can provide a professionally developed theme 270 to help students organize their prom related content items 210. This theme 270 can include predefined content 294 such as photographs taken by a professional photographer hired by the school 300. This predefined content 294 can be a mandatory part of the theme 270 that cannot be altered by the user. This allows an organization to insert a mandatory advertisement from a local establishment or a required message or photograph as predefined content 294 that must be included in a predefined theme 270. These themes 270 can be used to organize and format digital presentations of the content items 210, and can also be used to create printed publications of the content items 210, as is described in more detail below.

As shown 3, users 260 can also define their own group of friends 330. Friends 330 are formed in the database 200 by creating a friends link 262 between individual user records 260. The friends group 330 differs from the organizations 300, 310, 320 also shown in FIG. 3 in that the friends group 330 is not maintained by a single organization that controls its own membership, but is rather a dynamic grouping of users 260 that is defined and maintained by the users themselves. While the friends grouping 330 may not create predefined events 292 in the same manner as formal organizations 290, the friends group can be used to share content items 210 and event information 230 between friends, as is described in more detail below. For example, a user 260 may create an event definition 230 that is shared with all other users in their friends grouping 330. In some embodiments, a calendaring-type application can be integrated into or accessible by the user's mobile device app 134, so that a user-created calendar item could automatically be shared with their friends grouping 330.

In still other embodiments, individual users 260 are allowed to define a group of users as an ad hoc organization 290. This allows users to define their own set of acquaintances (other users 260) for a particular purpose or event. For instance, classmates may invite twenty fellow students to a party, and then define an ad hoc organization for that party. The members of the ad hoc organization 290 will be limited to only those users 260 that have been invited to the party. The party organizer could then create predefined events 292 for the members of that ad hoc organization 290. These events 292 would assist users in creating content clusters 220 and events 230 from their own party-related content items 210. User-created organizations 290 could also develop their own themes 270, theme events 272, and pre-defined content 294, just like other, more formal organizations 290. Furthermore, the creation of these ad hoc organizations 290 will assist users 260 with defining sharing preferences, making it easier, for example, to share party-related content items 210 with all attendees of the party, as is described in more detail below. Shared content items 210 could even be aggregated into a single, "official" content grouping 240 for the party by the party organizer. In these embodiments, a single user 260 (the party organizer) would create the organization 290 and invite particular other users 260 to join. The single user organizer might then retain the power to define predefined events 292 and related content 270, 272, 274, 280, and 294 for the new organization 290, or that power might be shared with one or more other members 260 of the organization 290.

Content Handling

Figure 4:
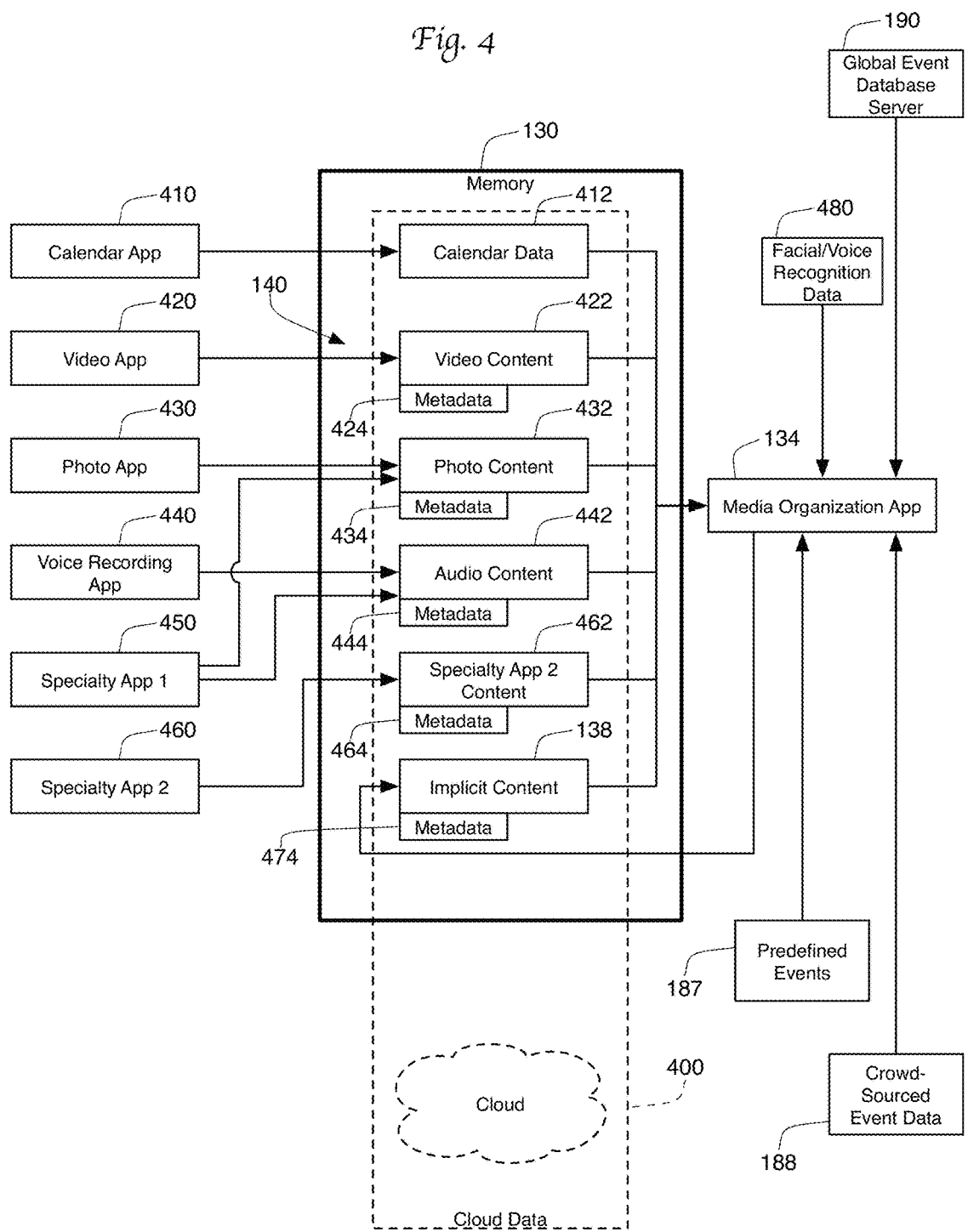
FIG. 4 is a schematic diagram of showing an application accepting input to form a content cluster.

FIG. 4 schematically illustrates the interaction of the media organization app 134 with content 140 and the other inputs that allow the media organization app 134 to create content clusters. In one embodiment, the content 140 is found in the physical memory 130 of the mobile device 100. In another embodiment, this content data 140 is found on "the cloud" 400, meaning that the data is stored on remote servers 180, 192 accessible by the mobile device 100 over network 170. The dual possible locations for this content 140 is shown in FIG. 4 by locating the content data 140 both within memory box 130 and the dotted cloud storage box 400.

The explicit media content 136 shown in FIG. 4 includes video content 422, photo content 432, and audio content 442. The video content 422 is created by a video app 420 running on the processor 120 of the mobile device 100. When the video content 422 is created, it is stored along with metadata 424 that describes the video content 422, including such information as when and where the video was created. Similarly a photo app 430 creates the photo content 432 and its related metadata 434, and a voice-recording app 440 creates audio content 442 and metadata 444. These three apps 420, 430, 440 may be standard apps provided along with the mobile operating system when the user purchased the mobile device 100. The data 422, 432, 442 from these apps 420, 430, 440 are stored in known locations in the local memory 130 or on the cloud data system 400.

Third party or specialty apps 450, 460 can also create explicit content 136 that is accessed by the media organization app 134. The first specialty app 450 creates both photo content 432 and audio content 442, and stores this data 432, 442 and related metadata 434, 444 in the same locations in memory 130 where the standard apps 430, 440 provided with the device 100 store similar data. The second specialty app 460 also creates explicit media content 462 and related metadata 464, but this content 462 is not stored in the standard locations in memory 130. However, as long as the media organization app 134 is informed of the location of this specialty app content 462 on memory 130, such content 462 can also be organized by the app 134.

In addition to the explicit content 422-462, the media organization app 134 also organizes implicit content 138 and its metadata 474. In one embodiment, this implicit content 138 is created by the same app 134 that organizes the content 140 into content clusters. In other embodiments, the media organization app 134 is split into two separate apps, with one app monitoring the sensors 150 and creating implicit content 138, and the other app 134 being responsible for organizing content 140.

FIG. 4 also shows a calendar app 410 creating calendar data 412 on the mobile device 100. In one embodiment, this data can be used by the media organization app 134 as it arranges content 140 into content clusters. As explained below, the calendar data 412 may have explicit descriptions describing where the user was scheduled to be at a particular time. The media organization app 134 can use this data to develop a better understanding about how to organize content 140 that was acquired at that same time. The app 134 also receives additional information about occurrences and events from the global event database server 190, and the predefined events 187 and the crowd-sourced event data 188 from the media organization server 180. The data from these sources 187, 188, 190 is also very useful to the app 134 as it organizes the content 140.

The app 134 accesses all this content 140, from the same locations in which the data was originally stored by the creating apps 410-460 and organizes it into content clusters using additional data from servers 180 and 190. In most cases, the content 140 is organized based primarily on the metadata 424, 434, 444, 454, 464, and 474 that was attached to the content 140 by the app that created the content 140. In some circumstances, the media organization app 134 can augment the metadata. For instance, the app 134 could use facial recognition (or voice recognition) data 480 available on the mobile device 100 or over the network 170 to identify participants in the content 140. Such recognition can occur using the processor 120 of the mobile device, but in most cases it is more efficient to use the processing power of a cloud content server 192 or the media organization server 180 to perform this recognition. Regardless of where it occurs, any matches to known participants will be used by the app 134 to organize the content 140.

Example Content Clusters, Events, and Presentation Grouping

Figure 5:
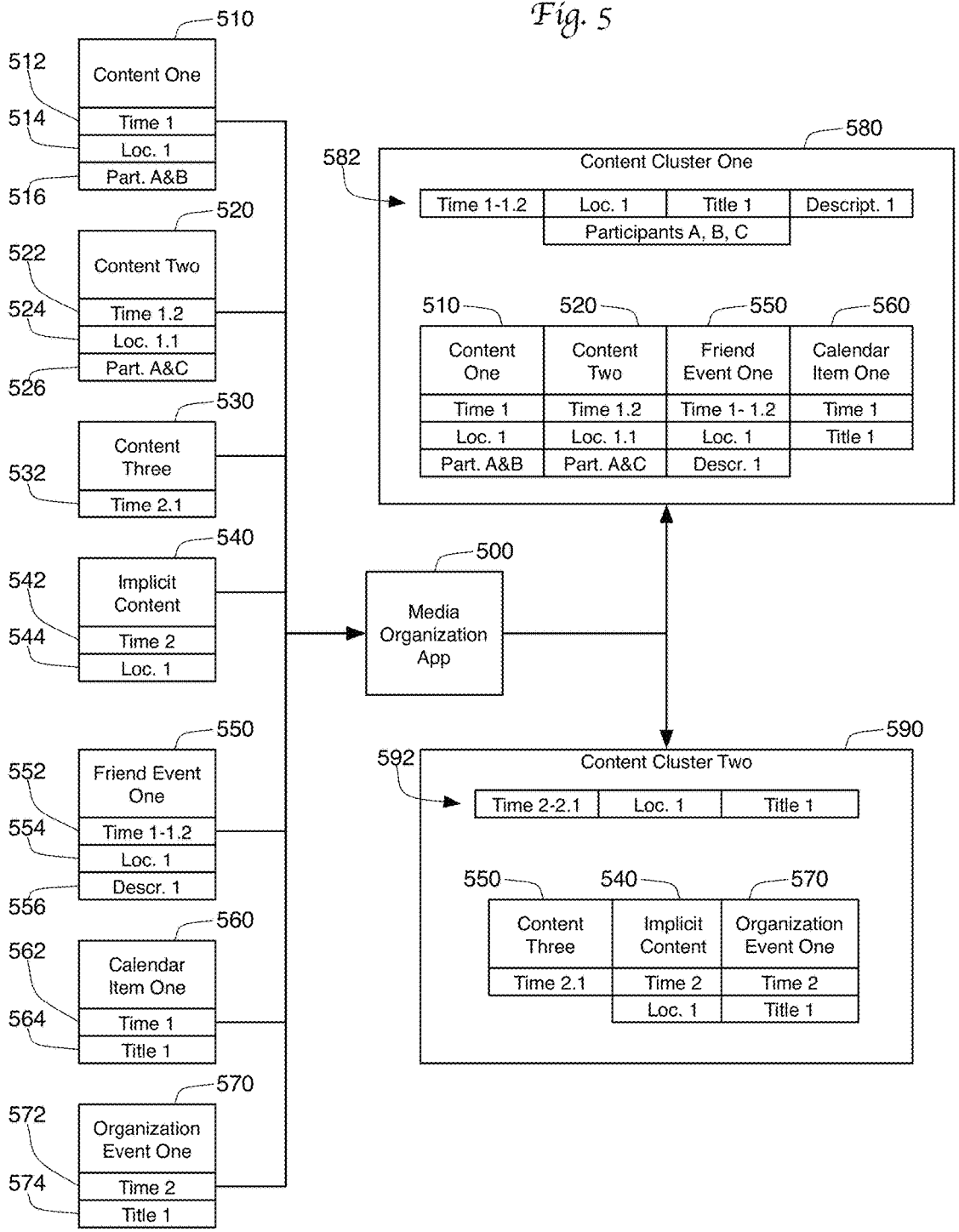
FIG. 5 is a schematic diagram showing content being clustered by a media organization app.

FIG. 5 shows an example of one embodiment of a media organization app 500 organizing a plurality of items 510-570 into two content clusters 580, 590. In this case, there are three items of explicit content, namely content one 510, content two 520 and content three 530. Content one 510 is associated with three items of metadata 512-516, which indicate that content one 510 was acquired at time "Time 1" (312), at location "Loc. 1" (314), and that participants A and B participate in this content (metadata 516). Content one 510 could be, for example, a photograph of A & B, taken at Time 1 and Loc. 1. Similarly, the metadata 522-526 for content two 520 indicates that it was acquired at time "Time 1.2" (slightly later than time "Time 1"), location "Loc. 1.1" (close to but not the same as "Loc. 1"), and included participants A & C. The metadata for content three 530 indicates only that it occurred at time "Time 2.1".

In addition to the three explicit content items 510, 520, 530, the media organization app 500 is also organizing one implicit content item 540, which has metadata 542, 544 indicating that it was taken at time "Time 2" and location "Loc. 1", respectively. The media organization app 500 has also obtained data 550 from one of the event database sources 187, 188, 190. In this case, the data 550 is taken from the crowd sourced events 188 that were created by other users. The presence of this data 550 in the media organization server 180 indicates that another user has already clustered their own content items 210 into events 230 and has uploaded this data 550 into the media organization server 180. The events in the crowd-sourced events 188 do not contain actual media content from other users, but rather the metadata that previous users have used to define an event. For instance, if another user had clustered content from a high school party into an event and has labeled the event, the crowd-sourced event data 188 would be able to suggest that other content taken at the same time and in the same location might be related to this same event. It is not difficult to imagine a scenario where many different users have defined different events that occurred at the same general time and in the same general location as other events. Because of this, users may elect to only view crowd-sourced events from friends 330 or from co-members of the organizations 290 to which the user belongs. In the example shown in FIG. 5, the crowed-sourced event 550 is an event that was created from a friend 330 of the user.

This data 550 indicates (through metadata 552-556) that an event with a description of "Descr. 1" occurred at location "Loc. 1" for the duration of "Time 1-1.2". The app 500 also pulled relevant information from the calendar data 412 and discovered a relevant calendar event 560, which indicates that the user was to be at an event with a title of "Title 1" at time "Time 1."Finally, the app 500 pulled organization event one 570 from the predefined events 187 that were created by one of the organizations 300, 310, 320 to which the user belongs. This organization event one 570 describes an event with a title of "Title 1" at time "Time 2".

The media organization app 500 gathers all of this information 510-570 together and attempts to organize the information 510-570 into content clusters. In this case, the app 500 identified a first cluster 580 consisting of explicit content one 510, explicit content two 520, friend-defined event one 550, and calendar item one 560. The media organization app 500 grouped these items of data 510, 520, 550, 560 primarily using time and location information. The app 500 recognized that each of these items occurred at a similar time between "Time 1" and "Time 1.2". Furthermore, to the extent that the items 510, 520, 550, 560 identified a location, the location was either "Loc. 1" or close by location "Loc. 1.1". In effect, each of these items were proximal to each other with respect to time and location. One advantage of using calendar data 412 or data from event databases 187, 188, 190 is that some of this data 412, 180, 190 will identify not just a single time but also actual time duration. For instance, the calendar data 412 may indicate that a party was scheduled from 6 pm to 2 am. Based on this duration information, the media organization app 500 will be more likely to cluster content from 6 pm and content at 1 am as part of the same event. Similarly, the calendar data 412 may identify a family camping trip that lasts for two days and three nights, which might cause the app 500 to group all content from that duration as a single event.

Occasionally, event information from multiple sources might conflict. For instance, in FIG. 6 content cluster one 580 included both friend event one 550 and the calendar item one 560 event information, which did not appear to contain conflicting information. In other circumstances, content cluster one 580 may also contain information from the global event database server 190 that relates to a completely different event that also occurred at Time 1 and Loc. 1. Because conflicting information is possible, one embodiment of the present invention prioritizes the various event metadata sources according to a confidence ranking. For example, event information might be ranked from level of highest to lowest confidence as follows:
  1) event information from a user's personal calendar;
  2) predefined events 187 from organizations 300-320 to which the user belongs;
  3) crowd sourced events 188 from friends 330;
  4) crowd-sourced events 188 from users that belong to the same organizations 300-320 as the user;
  5) events in the global event database server 190; and
  6) crowd-sourced events 188 from strangers.
With this type of ranking, event information with a higher priority takes precedence over conflicting event information with a lower priority.

In other circumstances, apparently conflicting event information can be distinguished from one another by narrowing the time and location scope of the occurrence. For example, Lincoln High School may schedule three different event occurrences for the school on a Saturday morning. While all events take place in the same building at the same time, the debate practice is scheduled for the first floor auditorium, while the other two events take place on the third floor of the school. While GPS sensors 158 may not be able to identify which room a user occupies after entering the school building, other technologies do exist that allow this type of differentiation. For example, IZat location technology (from Qualcomm Inc. of San Diego, Calif.) allows augmented positioning based on WiFi sensors indoors. Similar technologies are available from other vendors, all of which allow mobile devices to identify current indoor location. This information can be included with the metadata of the content items 510-540, which would allow more accurate grouping of this data with each other and with the event metadata information 550-570.

Once the media organization app 500 identifies items 510, 520, 550, 560 as being part of the cluster 580, it stores this information in media organization data 139 on the mobile device 100. This information may also be stored in the user content 186 stored for the user on the media organization server 180. In particular, database 200 will create a content cluster database entity 220 associated with these content items 210. The information 220 about cluster 580 not only identifies items of data 510, 520, 550, 560, as belonging to the cluster, but also aggregates the metadata from these items into metadata 582 for the entire content cluster 580. This metadata 582 includes metadata from the explicit content 510-320, which indicated that this content within this cluster 580 occurred during the time duration of "Time 1-1.2" and at location "Loc. 1." The metadata from content items 510 and 520 also indicated that this content involved participants A, B, and C. In addition, because the media organization app 500 accessed the calendar data 412 and the data from the event databases 187, 188, 190, the content cluster metadata 482 can also indicate that this content relates to an event with the title "Title 1" having a description "Descr. 1".

The second content cluster 590 grouped together explicit content 530, implicit content 540, and organization event one 570 primarily because these items 530, 540, 570 all occurred at time "Time 2" or soon thereafter ("Time 2.1") and indicated either that they occurred at the same location ("Loc. 1") or did not indication a location at all. The cluster metadata 592 for this content cluster 590 indicates the time frame ("Time 2-2.1") and location ("Loc. 1") taken from the explicit content 530 and the implicit content 540. The metadata 592 also includes the title "Title 1" from the organization event one 570, which was linked with the others items 530, 540 by the common time frame.

An important feature of this embodiment of the present invention is that the clustering of content 580, 590 is done automatically without user involvement. The user only needs to create explicit content 136 with their mobile device 100 using their normal content creation apps 132. These apps 132 save their explicit content 136 as usual. The media organization app 500 can run in the background creating implicit content 138 (pursuant to earlier user instructions or preference settings). At a later time, the media organization app 500 gathers the content 140, makes inquiries from external event databases 187, 188, 190, examines the user calendar data 412, and then creates content clusters 580, 590 for the user. This later time can be when the user opens the media organization app 500 is opened and requests that the content clustering step occur. Alternatively, this later time can occur periodically in the background. For instance, the user may request through preference settings that the content clustering and database inquiries take place every night between midnight and two a.m., but only when the mobile device 100 is plugged into a power source.

Figure 6:
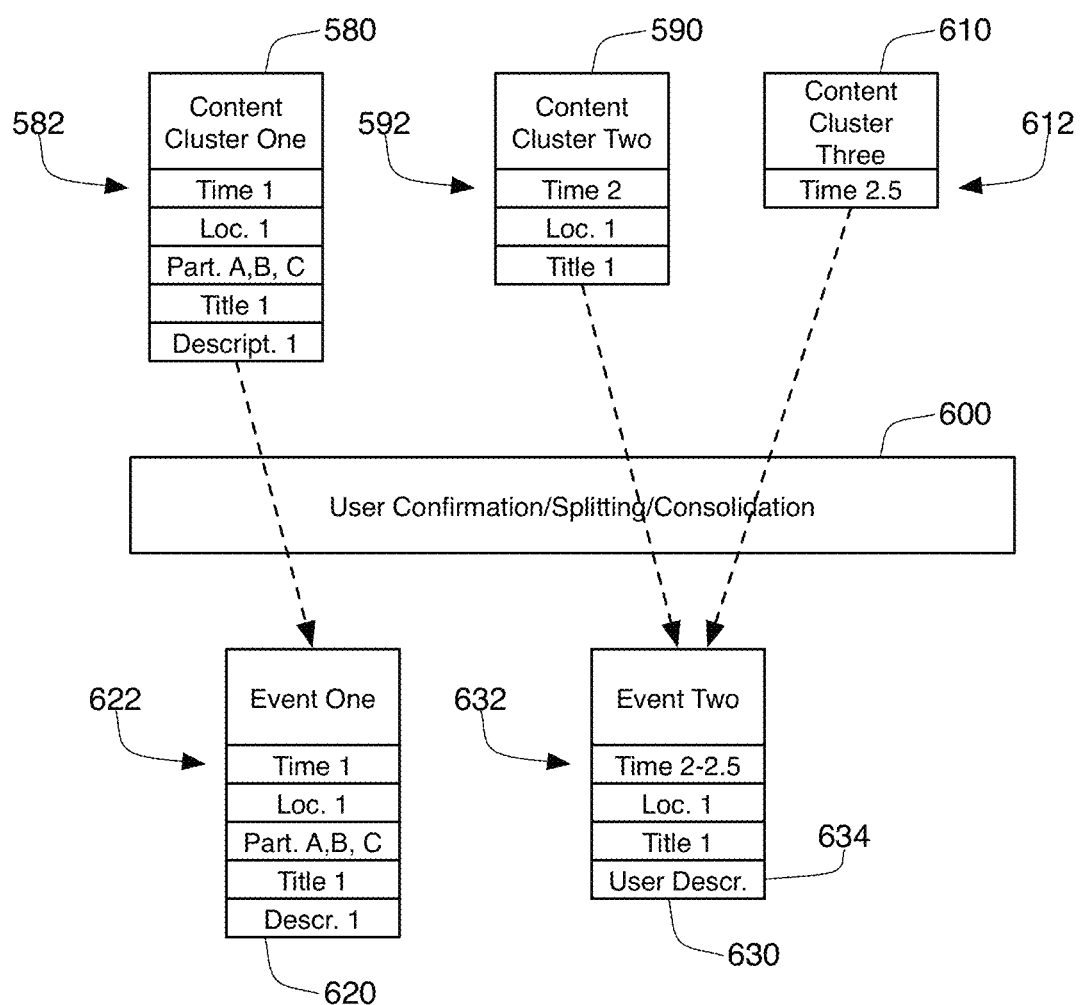
FIG. 6 is a schematic diagram showing content clusters being confirmed as events through a user interface.

Because the content clustering shown in FIG. 4 takes place without user involvement, the media organization app 500 preferably gives the user the right to affirm or correct these clusters 580, 590. In FIG. 6, content cluster one 580, cluster two 590, and a third content cluster 610 are presented to a user through a user interface, represented in FIG. 6 by element 600. The user interface 600 presents these clusters 580, 590, 610 and their contents for the user to review. The user can confirm a cluster as accurate and complete, as this user did with content cluster one 580. When a cluster 580 is confirmed, the media organization app 500 will consider the cluster to be a user-confirmed event, such as event one 620 shown in FIG. 6. In the database 200, a new event database entity 230 can be created and linked to the previously created content cluster database entity 220. Note that event one 620 contains the same metadata 622 that the content one cluster 580 had (metadata 582) before it was confirmed. In the preferred embodiment, the user will be given the ability to add additional metadata related to event one 620 through interface 600, meaning that event one 620 may have more metadata than content cluster 580.

The metadata associated with each event 230 in database 200 can be used to create the crowd-sourced events 188 that are made available to other users. To avoid privacy concerns, users may be requested to authorize this sharing of this metadata before a user-created event 230 will be shared with others as a crowd-sourced event 188.

Sometimes the user will wish to consolidate two different clusters into a single event. In FIG. 6, the media organization app 500 created separate clusters 590, 610, with cluster Two 590 occurring at time "Time 2" and cluster three 610 occurring at time "Time 2.5." While the app 500 viewed these time frames as different enough as to create two separate clusters 590, 610, the user in FIG. 4 chose to combine the separate clusters 590, 610 into a single user-confirmed event two 630. Note that the metadata 632 for event two 630 includes a time frame "Time 2-2.5" derived from the metadata 592, 612 of both of the original content clusters 590, 610. The event two metadata 632 also can contain user added additions, such as the user description 634 of this event 630. Note that because this event 630 was formed by merging two separate clusters 590, 610, the event database entity 230 for this event 630 will be linked to both of the grouped content cluster database entities 220. It would also be possible for a user to use interface 600 to split a single content cluster into multiple, separate events, although this is not shown in FIG. 6.

Each user-defined event 620, 630 includes one or more content items 140 that relate to a particular event that was likely attended by the user. The event might be a wedding, a party with a friend, or a child's swim meet. By clustering the content 140 together into events 620, 630, the user can better appreciate the content 140. Furthermore, these events 620, 630 are enhanced by the addition of implicit content 138, and by the added data from calendar data 412 or one of the event databases 187, 188, 190.

Figure 7:
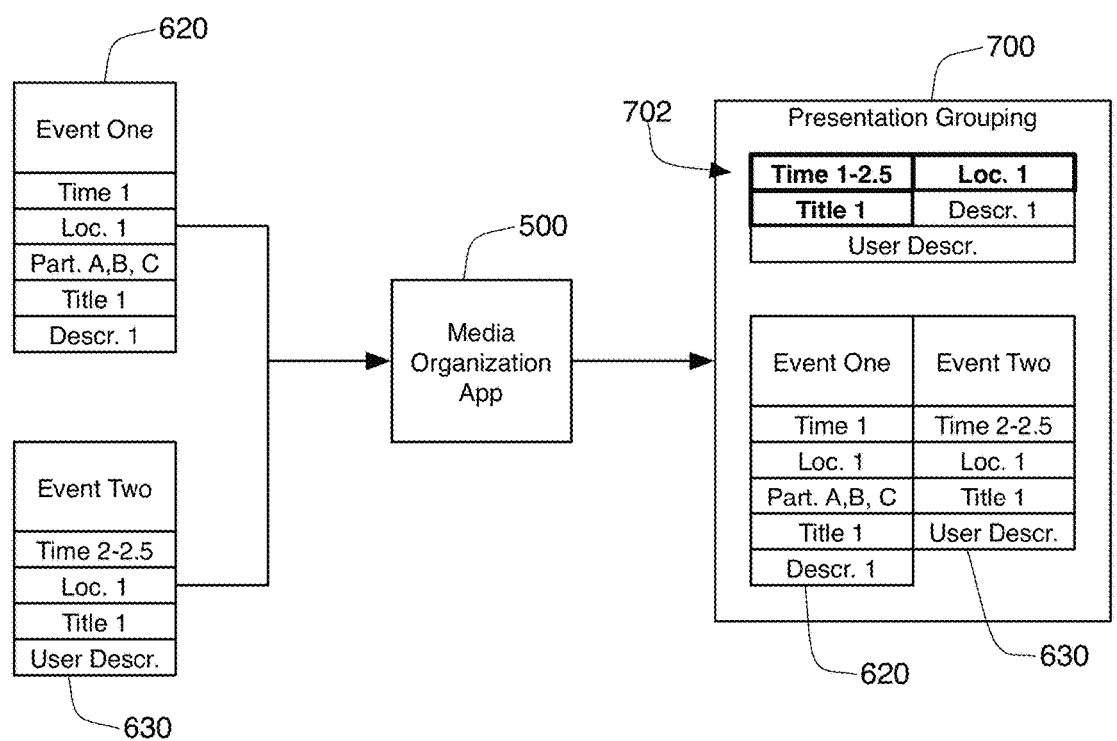
FIG. 7 is a schematic diagram showing events being clustered into a presentation grouping by the media organization app.

In FIG. 7, the media organization app 500 is being used to establish a presentation grouping 700. A presentation grouping 700 is a grouping of two or more events according to a common subject for presentation together. The presentation may be slide show, a video file, a web site, or some unique combination that combines the media from multiple events 620, 630 into a single presentation. Events 620, 630 are grouped together by a common theme or subject. It is possible that some events 620, 630 will be grouped into multiple presentation groupings 700, while other events will not be grouped into any presentation groupings 700.

In FIG. 7, event one 620 is shown having title "Title 1" taken from the calendar item one 560 and event two 630 also has a title of "Title 1" taken from organization event one 570. The media organization app 500 recognizes this commonality, and then suggests that these two events 620, 630 be combined into a single presentation grouping 700. This grouping 700 contains both events 620, 630, and has metadata 702 taken from the metadata 622, 632 of the two events 620, 630. In FIG. 7, metadata 702 that was shared by all events 620, 630 in the presentation grouping 700 are bolded (namely the timeframe "Time 1-2.5", the location "Loc. 1" and the title "Title 1"), which indicates that these elements in the metadata 702 are most likely to apply to the presentation grouping as a whole 700.

Frequently, many events will be combined into a single presentation grouping 700. For instance, a user may have ten calendar entries all labeled "Third Grade Swim Meet." Although this parent attended all ten swim meets, the parent took pictures (i.e., created explicit media content 136) at only six of these meets. The media organization app 500 will cluster this content 136 into six content clusters, with each cluster also containing a calendar entry with the same "Third Grade Swim Meet" title. Each of these content clusters could be confirmed as separate events by the user using interface 600. Because of this commonality in titles, the app 500 will automatically create a presentation grouping 700 containing content 136 from all six swim meets without including intervening content that is not related to the swim meets.

The grouping of events into a single presentation grouping can occur automatically though the media organization app 500, although it is expected that the user will be given an interface (such as interface 600) to confirm the appropriateness of these groupings. When a presentation grouping 700 is created, a presentation grouping database entity 240 is created in the database 200 and associated with the underlying events 230.

In the example shown in FIG. 7 the two events 620, 630 were grouped in a single presentation grouping 700 because they shared same title "Title 1." While they also shared the same location ("Loc. 1"), this might not have been enough commonality for the app 500 to group the events 620, 630 together. However, the media organization app 500 may have grouped events from the same location together if they shared other characteristics, such as always occurring on Tuesday at the same time of day and same location. Furthermore, events that have different titles but are all predefined 292 by a single organization 290 (such as the football team 310) might also be grouped together by the app 500. Similarly, if a group of friends all had children on the same swim team and each created events having a similar title that were shared as crowd-sourced events 188 with each other, the similar titles could be used to group the events 620, 630 into a single presentation grouping 700.

Clustering Methods

Figure 8:
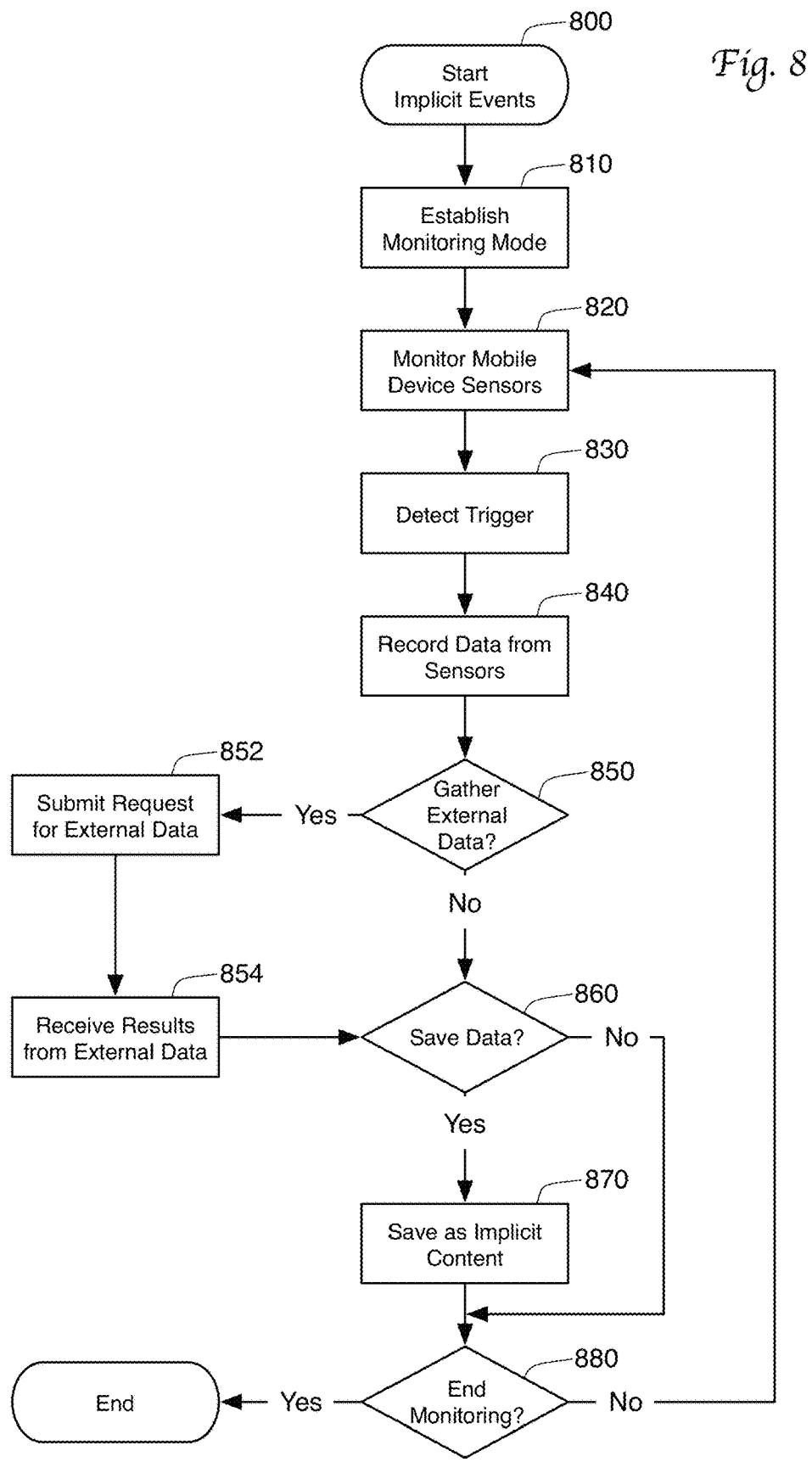
FIG. 8 is a flow chart showing a method for generating implicit content.

FIG. 8 shows a method 800 that is used to create implicit content 138 on the mobile device 100. The method begins at step 810, during which a user selects a particular mode to be used to monitor the sensors 150 of the mobile device 100. The selected monitoring mode establishes which of the sensors 150 will be monitored by the method 800, and also establishes a trigger that will be use to start recording data. For example, a walking tour mode could be established in which an accelerometer is routinely (every few seconds) measured to determine whether an individual is currently walking (or running). A trigger event could be defined to detect a change in the walking status of the individual (e.g., a user who was walking is now standing still, or vice versa). Alternatively, the trigger could require that the change in status last more than two minutes. This alternative walking tour mode would be designed to record when the user starts walking or stops walking, but would not record temporary stops (for less than two minutes). For example, a user who is walking down a path may meet a friend and talk for ten minutes, and then continue down the path. When the user reaches a restaurant, the user stops, has lunch, and then returns home. This mode would record when the user started walking, when the user stopped to talk to a friend, when the user started again, when the user ate lunch, when the user finished lunch and stared walking home, and when the user returned home. This mode would not record when the user stopped to get a drink of water (because the user stopped for less than two minutes), or when the user got up at lunch to wash his hands (because the user walked for less than two minutes). Other modes might include a car trip mode, which would monitor an accelerometer and GPS device to record car stops that lasted longer than an hour, or a lunch conversation mode, which randomly monitors the microphone to listen for human voices and records one minute of the conversation if voices are recognized. The point of selecting a monitoring mode in step 810 is to ensure that the user approves of the monitoring of the sensors 150 that must be done to create implicit content 138, and that the user desires to create this type of content 138.

Once the mode is established, the processor 120 will monitor the sensors 150 of the mobile device 100 at step 820 looking for a triggering event. The sensors 150 to be monitored and the triggering event will be determined by the selected monitoring mode. If the processor 120 detects a trigger at step 830, the processor 120 will record data from the sensors 150 in step 840. Note that the data recorded from the sensors 150 does not have to be limited to, or even include, the sensor data that was used to detect the trigger in step 830. For instance, the triggering event may be that the user took their cellular phone 100 out of their pocket. This could be determined by monitoring the accelerometer 160 and the ambient light sensor 164. When this occurs, the processor 120 might record the location of the device 100 as indicated by the GPS sensor 158, the current time as indicated by the clock 156, and the next two minutes of conversation as received by the microphone 154.

Step 850 determines whether data from external sources are to be included as part of this implicit content 138. Such data may include, for example, the weather at the currently location of the device 100, or the presence of mobile devices 100 belonging to friends in the general proximity. If step 850 determines that external data will be included, a request for external data is made in step 852, and the results of that request are received in step 854. For example, the media organization app 134 might request local weather information from another app on the mobile device 100 or from a weather database 194 accessible over the network 170. Alternative, a "locate my friends" app that detects the presence of mobile devices belong to a user's friend could be requested to identify any friends that are nearby at this time. The data from these apps or remote servers is received at step 854, and combined with the data recorded from the sensors 150 at step 840.

At step 860, a determination is made whether to save this accumulated data. In some circumstances, a monitoring mode may establish that the data gathered after a triggering event (step 830) is always to be stored as an implicit content 138. In other circumstances, the monitoring mode may impose requirements before the data can be saved. For instance, the lunch conversation mode may not save the recorded audio as implicit content 138 if analysis of the recording indicates that the voices would be too muffled to be understood. If the condition for saving the data under the monitoring mode is met at step 860, then the data (including both sensor data recorded at step 840 and external data received at step 854) is recorded as implicit content at 870. If the step 860 determines that the condition is not met, step 870 is skipped. At step 880, the process 800 either returns to monitoring the device sensors 150 at step 820, or ends depending on whether additional monitoring is expected by the monitoring mode.

Figure 9:
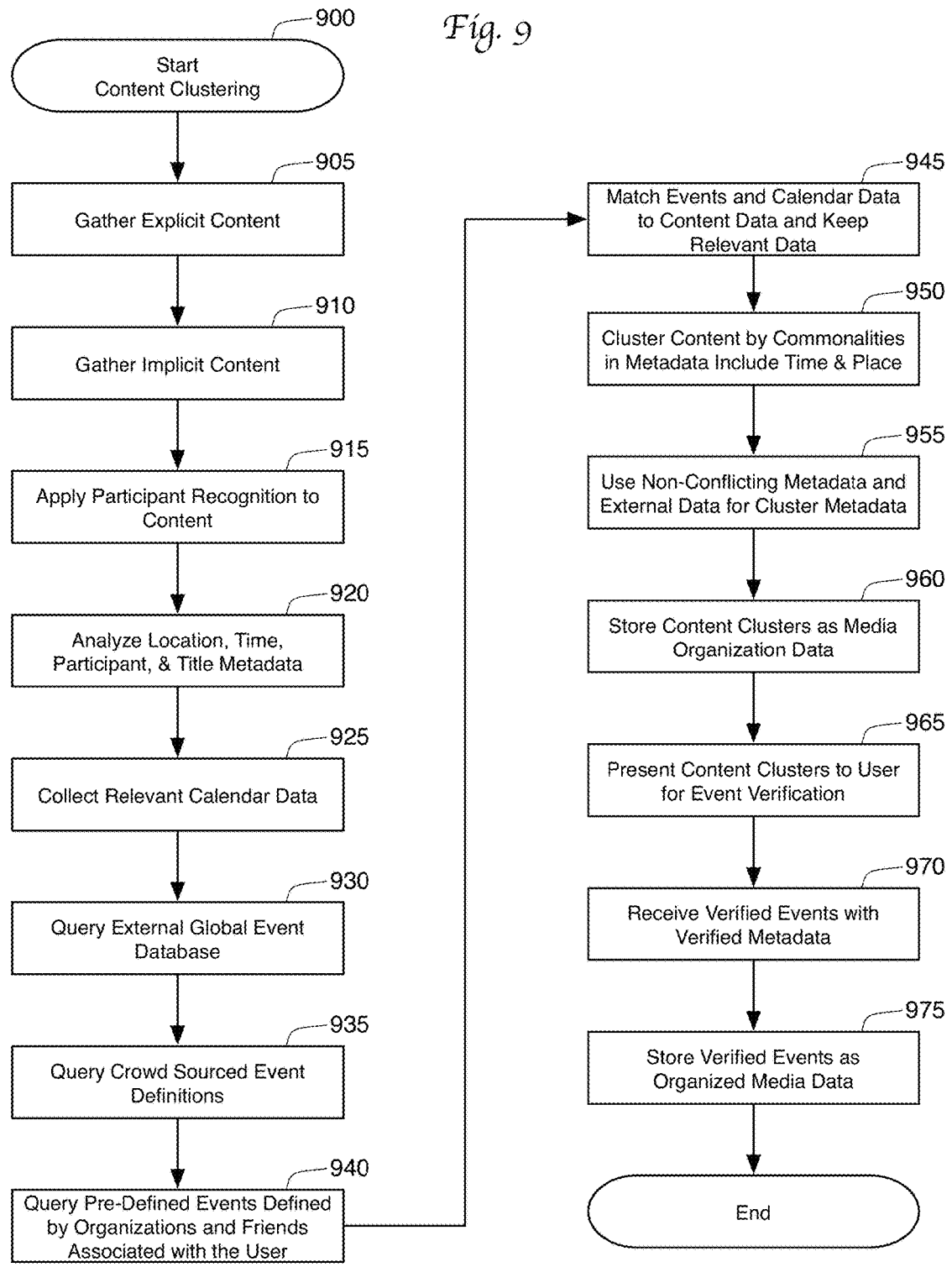
FIG. 9 is a flow chart showing a method for content clustering.

FIG. 9 shows a method 900 for clustering content 140 into content clusters. This process is described below as occurring on the mobile device 100 under control of the media organization app 134. In other embodiments, this process 900 can be accomplished on the media organization server 180, and the results can be accessed from the mobile device 100 or from any other computing device with access to the network 170.

The process 900 starts at step 905 by gathering the explicit content 136 from the memory 130 on the mobile device 100 and from remote storage 186, 192 accessible from the mobile device 100. Next the implicit content 138 is gathered at step 910, again either from memory 130 or from remote storage 186, 192, or both. These steps 905, 910 may gather all information available at these data locations, or may only search for new content 140 added since the last time the app 134 organized the content 140.

At step 915, the media organization app 134 accessing facial or voice recognition data 480 in order to supplement the participant information found in the metadata for the gathered content 140. Of course, this step 915 could be skipped if participant information was already adequately found in the metadata for the content 140, or if no participant recognition data 480 were available to the app 134.

At step 920, the media organization app 134 analyses the metadata for the content 140, paying particular attention to location, time, participant, and title metadata (if available) for the content 140. Using the time information taken from the content 140, the app 134 analyzes the calendar data 412 looking for any calendar defined events that relate to the content 140 being analyzed (step 925). In addition, the app 134 uses time and location information from the content 140 to search for occurrence information from one or more third party event databases 190 (step 930). The app 134 also makes a similar query at step 935 to the crowd-sourced event definitions maintained by the media organization server 180. This step 935 could limit the requests to crowd-sourced events 188 from friends 330, or could include all crowd-sourced events 188. In addition, the app 134 will make a request to the media organization server 180 at step 940 for any predefined events 187 related to these times and locations that have been created by organizations to which the current user belongs (or for events and calendar items from members of the user's friend grouping). Step 940 could also search for locally stored predefined events 187 and calendar items that had been previously downloaded from the media organization server 180 or shared by a peer-to-peer sharing system from other users. If the calendar data or the responses to the queries made in steps 930, 935, 940 contain data that is relevant to the content 140 being analyzed, such data will be included with the content 140 at step 945. Relevant calendar data is considered that calendar data that has time metadata proximal to the time of the content gathered in steps 905 and 910, and location metadata proximal to the location of the gathered content. This step 945 will also determine whether any of the event data received from steps 925-940 conflict with one another, and if so, use a prioritized ranking to determine which event information to include with the content 140.

At step 950, the content 140 and the relevant data from steps 925-940 are clustered together by comparing metadata from the content 140 and the added data. In one embodiment, clusters are based primarily on similarities in time metadata. In this embodiment, the app 134 attempts to group the content 140 by looking for clusters in the time metadata. In other embodiments, location metadata is also examined, whereby the app 134 ensures that no content cluster contains data from disparate locations.

At step 955, metadata is created for the content clusters by examining the metadata from the content 140 and the additional data obtained through steps 925-940. The clusters are then stored in the media organization data 139 in memory 130, in the user content 186 of the media organization server 180, or both (step 960).

At step 965, the automatically created content clusters are presented through a user interface to a user for confirmation as user-confirmed events. The user can confirm a cluster without change as an event, can split one cluster into multiple events, or combine two or more clusters into a single event. The app 134 receives the verified events from the user interface at step 970. The user can also confirm and supplement the metadata, adding descriptions and tags to the metadata as the user sees fit. Finally, the verified events are saved in step 975 with the media organization data 139 in memory 130, and/or in the user content 186 of the media organization server 180. As explained above, these data locations 139, 186 can be designed to hold only the organizational information for the content 140 while the content 140 itself remains in its original locations unaltered. Alternatively, all of the organized content 140 can be gathered and stored together as user content 186 stored at the media organization server 180. While this would involve a large amount of data transfer, the media organization app 134 can be programmed to upload this data only in certain environments, such as when connected to a power supply, with access to the Internet 170 via Wi-Fi Network Interface 144, and only between the hours of midnight and 5 am. Alternatively, this data could be uploaded continuously to the remote media organization server 180 in the background while the mobile device 100 is otherwise inactive or even while the device 100 is performing other tasks.

Figure 10:
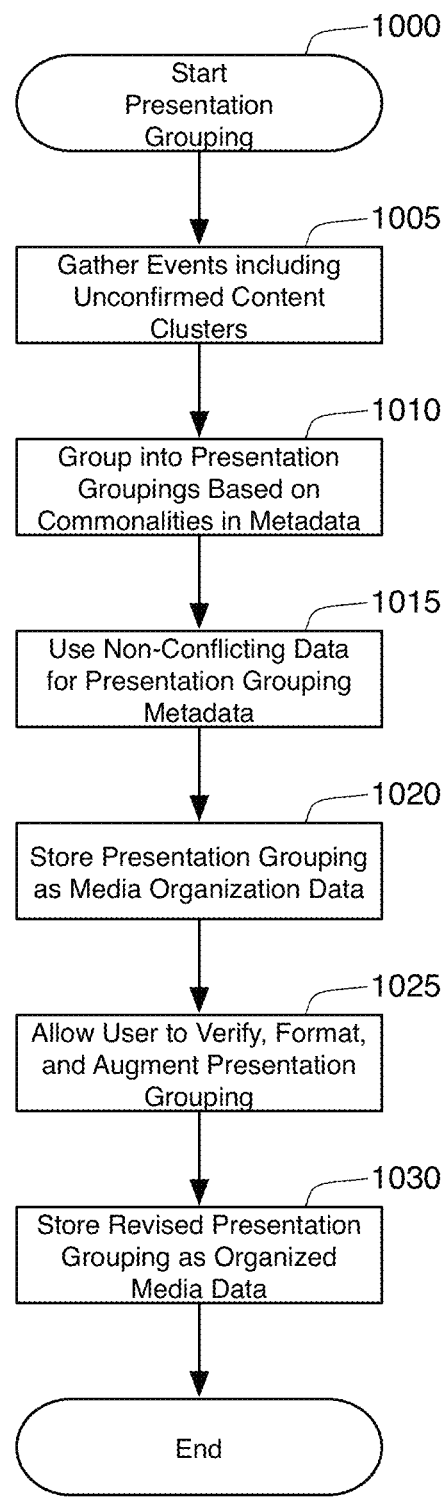
FIG. 10 is a flow chart showing a method for the grouping of events into presentation groupings.

FIG. 10 shows a method 1000 for grouping events into presentation groupings. As with method 900, this method 1000 is explained below as being performed by the media organization app 134, but could also be performed by the media organization server 180.

The method 1000 starts at step 1005, wherein events are identified by the media organization app 134 for grouping. Step 1005 might be limited to content clusters 220 that have formally become user-verified events 230 through steps 965 and 970. Alternatively, the process 1000 may include unverified content clusters 220 stored at step 955. At step 1010, the app 134 examines the metadata for each event 230 and cluster 220, and then attempts to find commonalities between the events 230 and clusters 220. As explained above, these commonalities can frequently be based upon event information obtained from calendar data 412 or from data obtained by outside event data 187, 188, 190.

In one embodiment, step 1010 uses commonality in the metadata that does not relate to closeness-in-time. The reason for this is that content that was collected close to the same time as other similar content would, in most cases, have already been clustered together into events. Consequently, it is likely that the separate events being grouped together into a presentation grouping would not share a common time with one another. However, it may be useful to recognize commonalities in the time metadata that are not related to closeness-in-time. For instance, the app 134 may recognize that numerous content clusters or events occur on Thursday evenings from 6 pm to 8 pm. The app 134 may recognize this as a connection between the events, and therefore propose combining all events that occur on Thursday evenings from 6 pm to 8 pm as part of a presentation grouping.

At step 1015, the app 134 uses the metadata from the combined events to create metadata for the presentation groupings. The presentation groupings and metadata are then stored at step 1020 in the media organization data 139 or in the user data 186 on server 180.

At step 1020, the user is allowed to verify the presentation groupings created at step 1010. The user is given the ability to add events or content 140 directly to a presentation grouping, or to remove events or content 140 from the presentation grouping. The user is also given the ability to modify the metadata, and to format the presentation grouping as desired by the user. As explained above, the presentation grouping may be used to create a web site, a slide show, or a video presentation of the combined content. As a result, numerous formatting options will be available to a user at step 1025 to format the presentation grouping. Example formatting options are described in further detail below. At step 1030, the user modifications to the presentation groupings are stored at locations 139 or 186, and the process 1000 ends.

Analytics

Figure 11:
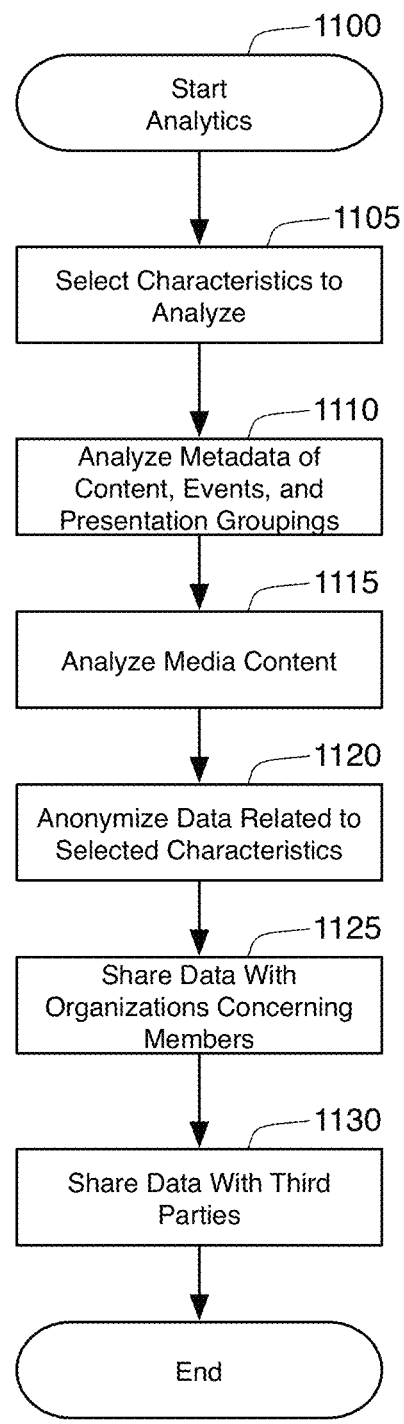
FIG. 11 is a flow chart showing a method for analyzing collected data.

FIG. 11 shows a process 1100 by which the media organization server 180 analyzes the data within its database 200. This process 1100 allows to server 180 to extract useful and valuable data from its database 200 that can be used to improve the services provided by the server 180 or to share with third parties. The process begins at step 1105 by selecting particular characteristics to analyze. For instance, the process 1100 could be used to analyze the restaurant selection behavior of users 260 that belong to a particular organization 290, or shoe fashion trends for a particular demographic segment of users 260. In the preferred embodiment, the user data 260 in the database 200 includes demographic information (such as age and home address) that can be used to assist in the analytics of process 1100.

Next, step 1110 analyzes metadata stored in the database 200 for content items 210, content clusters 220, events 230, and presentation groupings 240. If restaurant selection behavior was of interest, the names of restaurants could be searched for in the metadata, or geographic/GPS data that corresponded to restaurant locations could be identified. Typically, the metadata analyzed in step 1110 is either textual or numerical data, such as text-based user descriptions for an event, or a longitude/latitude data point for a photographic content item 210. In step 1115, the actual media content in the content items 210 is analyzed. This media content may include image data such as photographs or videos. Image analysis algorithms have been developed by numerous third parties and can be used to perform step 1115. For instance, Google, Inc. (Menlo Park, Calif.) has developed image analysis algorithms that are implemented in the Google Goggles image recognition apps available on iOS and Android mobile devices. By analyzing the image data in content items 210, the process 1100 may be able to identification locations at which the images were taken, products whose labels or logos are visible in the image, or demographic information about the people shown in those images. Both steps 1110 and 1115 will attempt to extract information from the media content items 210 and the metadata that is relevant to the characteristics selected in step 1105.

At step 1120, the data collected and analyzed in steps 1110 and 1115 is anonymized to remove any personally identifiable information from the data. Once this is done, the anonymized data related to the selected characteristics can be shared. In step 1125, this data is shared with organizations 290 having members 260 that are using the capabilities of the server 180. In some embodiments, the organizations 290 are only provided with information relating to the users 260 that are associated in the database 200 with that organization 290. In step 1130, the collected data is shared with third parties. The process 1100 then terminates.

This method 1100 may be able to identify information that is not easily obtainable from other sources. For instance, the process 1100 may identify the fact that people in photographs made by members of high school football teams are twice as likely to wear a particular brand of sneaker than the public at large. As the brand loyalties of young customers are easily swayed by their peers, this may be of particular interest to shoe companies. Alternatively, the process 1100 may indicate that a particular nightclub became less popular after a new nightclub opened in the same neighborhood. Process 1100 could even indicate that many old customers of the original nightclub (people with events 230 having location metadata at the original nightclub) now are more likely to have events 230 with location metadata at the new nightclub.

Presentation and Augmentation

Figure 12:
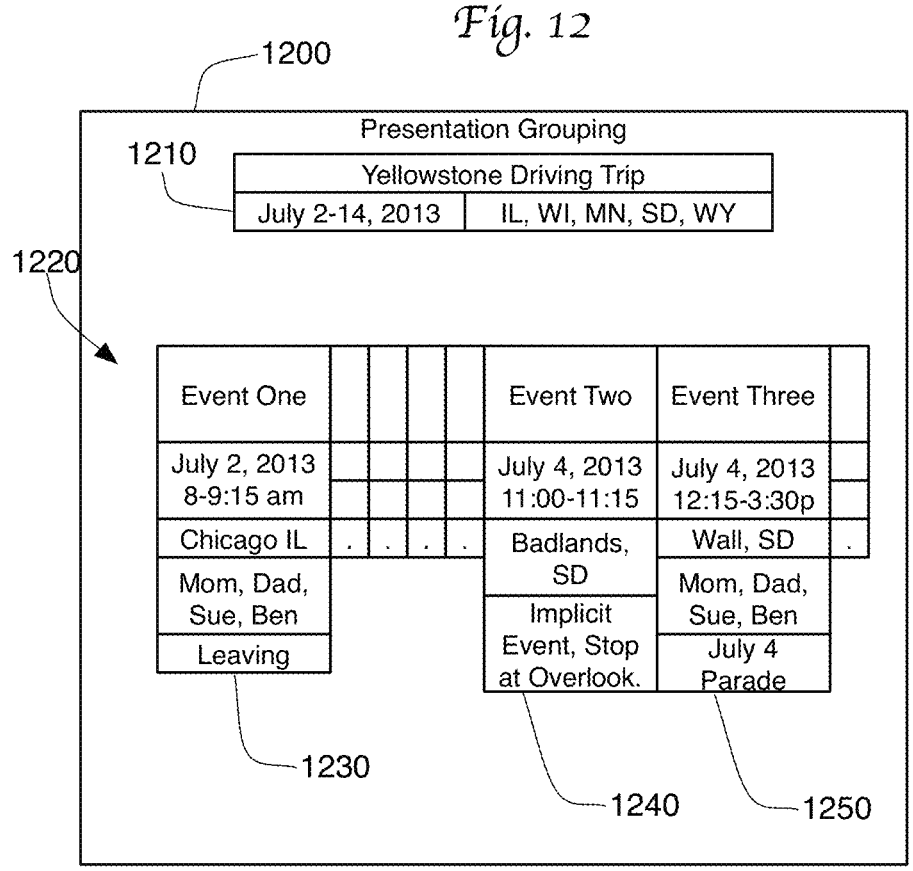
FIG. 12 is a schematic diagram of an example presentation grouping.

FIG. 12 shows a sample presentation grouping 1200. The metadata 1210 for this presentation grouping 1200 shows that the events 1220 that were grouped together in this presentation grouping 1200 all relate to a family's Yellowstone driving trip that took place from Jul. 2 to Jul. 14, 2013. This presentation grouping 1200 includes events 1220 that took place in Illinois, Wisconsin, Minnesota, South Dakota, and Wyoming.

The presentation grouping 1200 could include tens or even hundreds of events 1220. FIG. 12 shows details for only three events, event one 1230, two 1240, and three 1250. It should be understood that numerous events 1220 might occur in before, between, or after these particular events 1230, 1240, and 1250. Event one 1230 took place on Jul. 2, 2013 and related to leaving the family home in Chicago, Ill. Event two 1240 took place in the Badlands of South Dakota on the morning of Jul. 4, 2013. Event three 1250 took place when the family watched the parade in Wall, S. Dak. on Jul. 4, 2013.

Figure 13:
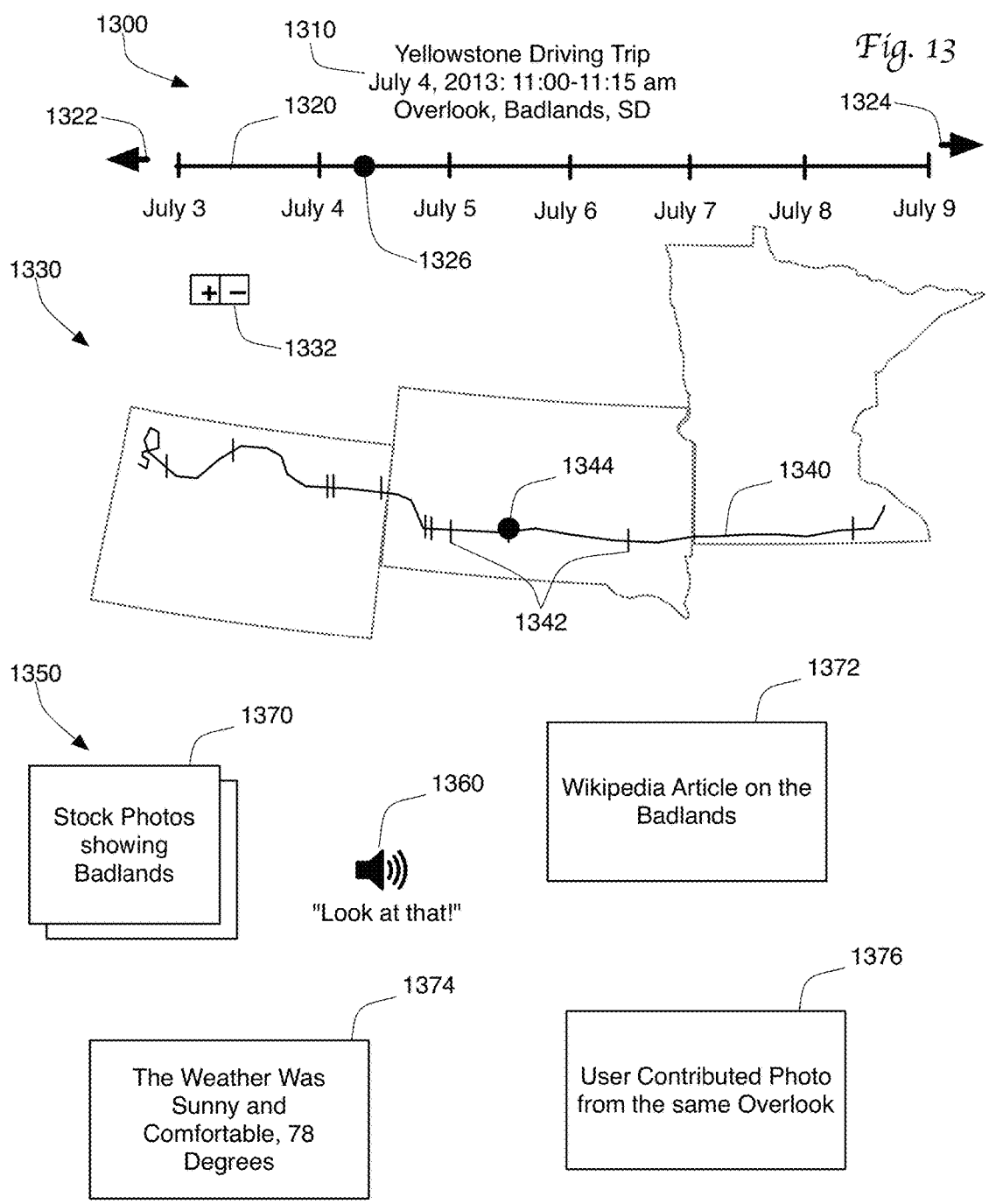
FIG. 13 is a schematic diagram of a user interface showing an event from the presentation grouping of FIG. 12.

The events in presentation grouping 1200 are used to create the user interface 1300 shown in FIG. 13. In the preferred embodiment, the media organization server 180 creates the user interface 1300. This is true even if the presentation grouping 1200 was created on the mobile device 100 using the media organization app 134. In one embodiment, when the presentation grouping 1200 is created and stored in the media organization data 139, it is also uploaded via network 170 to the database 200 that is stored on the media organization server 180. Alternatively, the content within the events 1220 could have been uploaded to the server 180, and the server 180 could have assisted the user in creating the presentation grouping 1200. One benefit to having the media organization server 180 create interface 1300 is that the interface 1300 could then be accessed by any user with access to the Internet 170. In one embodiment, the server 180 operates as a web server under the guidance of application programming 184, and the interface 1300 is a web interface provided over the Internet 170.

To create this interface 1300, the server 180 analyzes all of the events 1220 in the presentation grouping 1200, including the events one 1230, two 1240, and three 1250. The earliest and latest times associated with these events 1220 are identified (in this case, Jul. 2, 2013 and Jul. 14, 2013. A graphical timeline is then created that spans between these dates. In FIG. 10, this timeline 1320 shows a portion of the entire timeline of the presentation grouping 1200. A user can see more of the timeline by selecting arrows 1322 and 1324. The user could also "zoom out" to see all of the timeline 1320 using user interface element 1332. The timeline 1320 includes a single time indicator, in this case a black circle 1326. The user can drag this circle 1326 along the timeline 1320 to input a desired time. In this case, the user has located the circle 1326 on Jul. 4, 2013. More specifically, Jul. 4, 2013, between 11:00 and 11:15 am, as indicated by the heading 1310 shown on the interface 1300. This time corresponds to event two 1240.

In addition to the timeline 1320, the interface 1300 also includes a map 1330. Maps 1330 are particularly useful elements when displaying a presentation grouping 1200 that includes a plurality of different locations. For this family trip to Yellowstone, the map 1330 will show the family's route during the vacation. In this case, the map 1330 shows the states that the family traveled in during the time shown on the timeline 1320 (namely between Jul. 3 and Jul. 9, 2013). A user can zoom into or out of the map 1330 using interface element 1332. In one embodiment, using interface element 1332 will simultaneous zoom both the timeline 1320 and the map 1330, with the map 1330 always showing locations covered by the time period shown in the displayed portion of the timeline 1320. In other embodiments, separate zoom interface elements 1332 will be provided for the timeline 1320 and the map 1330.

The map 1330 includes a path 1340 showing the path of the user along the timeline. In this case, the path 1340 shows a route through Minnesota, South Dakota, and Wyoming and into Yellowstone National Park. The path 1340 can be derived from the events 1220 within the presentation grouping 1200 being displayed. In most cases, the presentation grouping 1200 will not have explicit information about every point on the path 1340, but instead will have multiple, discrete events 1220 along the path 1340. The points along the path 1340 that are associated with actual events 1220 in the presentation grouping 1200 are shown in FIG. 13 with short line hash marks 1342 on the path 1340. The portions of path 1340 that exists between these locations can be filled in using an intelligent "guess." For instance, most of the events 1220 occur on U.S. Interstate 90, so the server 180 can guess that the user traveled between these events 1220 following the Interstate. Alternatively, the user can manually add the correct path 1340 between the locations of the events 1220. In yet another embodiment, the path 1340 is not shown, and only the discrete locations 1342 of the events 1220 are displayed on the map 1330.

As the current time marker 1326 is found on the timeline 1320 at the time of event two 1240, a location marker 1344 is placed on the path 1340 at the location of event two 1240. This location happens to be a scenic overlook off of Interstate 90 looking over the Badlands in South Dakota. To change the event 1220 being viewed, a user is allowed to drag the time marker 1326 along the timeline 1320. In one embodiment, the marker 1326 will only "stick" on the timeline 1320 at time periods that define a particular event 1220. In this embodiment, movement of the time marker 1326 will cause a corresponding movement of the location marker 1344. Hence, if the time marker is moved to later in the day on Jul. 4, 2013 corresponding to event three 1250, the location marker 1344 on the map interface 1330 will correspondingly move to Wall, S. Dak. (as can be seen in interface 1400 shown in FIG. 14). The interface 1300 can be designed so that the user can similarly move the location marker 1344 along the path 1340 between events 1220 and have the time marker 1326 move correspondingly along the timeline 1320. Note that while the hash markers 1342 identify events 1220 on the path, there are no corresponding hash markers on the timeline 1320. Of course, such marks could be added to the timeline 1320. To the extent an event 1220 exists over a long time period (such as two days), the mark 1326 on the timeline 1320 could be similarly long.

In the interface 1300 shown in FIG. 13, event two 1240 was selected. The interface 1300 shows the content associated with this event 1240 in content location 1350. In this case, event two 1240 was an implicit event, which means that the user of the mobile device 100 did not explicitly direct the device 100 to take any video or still photos, to record any audio, or even make any note of the fact the car stopped at this overlook. However, process 800 detected a trigger event (such as the car stopping for more than ten minutes) and recorded the implicit content 138 that was the basis for this event 1240. The implicit content included the fact that the car stopped at this overlook from 11:00 to 11:15 am, and it included the geographic location of this stop (within the Badlands of South Dakota). Furthermore, the user's monitoring mode in process 800 caused the device 100 to record any conversation that may have occurred. In this case, the device 100 captured daughter Sue exclaiming "Look at that," followed by the mother explaining how the Badlands were formed. The audio recording 1360 is provided in the content area 1350 of interface 1300, which allows the family to relive a memory that they did not explicit record.

Because the server 180 knows the time and location of this event 1240, the server 180 is able to augment this data with content from third party information provider servers 194. In one example, the server 180 inquires about whether there are any locations of interest near this location. Various third parties provide public servers capable of providing this information, including Google Inc. (Menlo Park, Calif.). As this presentation grouping 1200 is concerning a family vacation, the server 180 will be paying particular attention to tourist destination information. In this case, the third party information provider server 194 would indicate that this location is in the Badlands. As a result, the server 180 can populate the content area 1350 of the interface 1300 with stock photography 1370 showing the Badlands. In addition, the server 180 may include a portion of the WIKIPEDIA article on the Badlands by requesting this information from the Wikipedia server 194 (Wikipedia is provide by the Wikimedia Foundation, Inc. of St. Petersburg, Fla.). The server 180 also knows the time (11:00 am) for this event 1240, so it can inquire about the weather at this time and place, and add this information 1374 to content area 1350.

Finally, the server 180 has within the user content data 186 information from many other users that have used the server 180. By accessing this information, the server 180 may be able to identify a photograph 1376 taken by another, unrelated user of the server 180 at that very same scenic overlook and include this photograph 1376 in the presentation 1300 of event 1240. The use of content from other user's can be limited to that content that has been donated for public use by other users of the server system 180.

Figure 14:
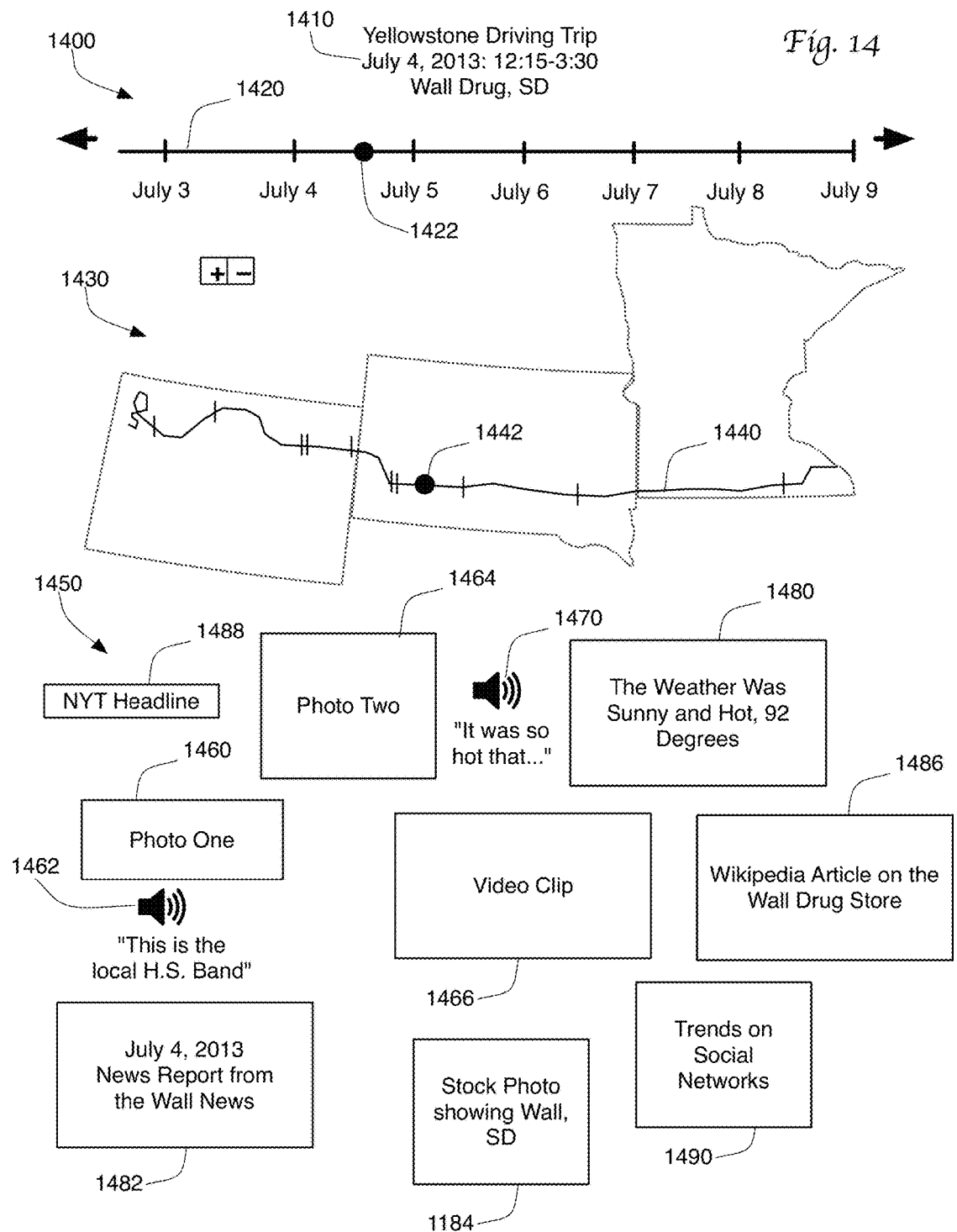
FIG. 14 is a schematic diagram of the user interface of FIG. 13 showing a different event from the presentation grouping of FIG. 12.

Interface 1400 in FIG. 14 displays content 1450 associated with event 1250. As was the case with interface 1300, interface 1400 identifies at 1410 the time and place of this event 1250, displays the timeline marker 1422 at the appropriate location on the timeline 1420 for the event 1250, and further displays the location marker 1442 on the appropriate location along the path 1440. For event 1250, the user did record explicit media content 136, namely photo one 1460, audio commentary 1462 taken during the event 1250 describing photo one 1460, photo two 1464, and video clip 1466. This content is displayed in the content presentation area 1450 of interface 1400.

This area 1450 also includes some audio commentary 1470 that was added to this event 1250 after-the-fact. Users are allowed to add content to events 1250 from a variety of sources in order to enhance the presentation 1400 of those events. This can take the form of audio commentary 1470, which helps "tell the story" of the event 1250. The commentary 1470 can be recorded the next day and connected to the event 1250 using the media organization app 134 on the mobile device 100, or weeks later when viewing the event 1250 through interface 1400 via a web browser.

Like interface 1300, interface 1400 also includes augmentation from external data sources acquired over the Internet 170. In this case, the server added weather information 1480 for Wall, S. Dak. on Jul. 4, 2013 at 1:00 pm, a news report 1482 from the local paper for that day, and stock photography of Wall, S. Dak. 1484. By searching for nearby locations of interest, the server 180 would have identified Wall Drug and may have elected to include a Wikipedia article 1486 on the drug store. All of this information 1480-1486 relates directly to the location identified for this event 1250. Information related primarily to the identified time for the event 1250 but not the location may also be included. For instance, the headline from the New York Times 1488 could be included for this date, which would note any major event that may have been occurring elsewhere in the world, while interesting trends on the Internet or on social media 1490 could also be added.

While the content 1460-1490 in content presentation area 1450 may appear cluttered in FIG. 11, the server 1480 allows a user to pick and choose among the content 1460-1490 and to format this content 1460-1490 as they desire. This formatting information will be stored with the event 1250 within the presentation grouping 1200, so that later viewers of the event 1250 will see the preferred format for interface 1400.

Figure 15:
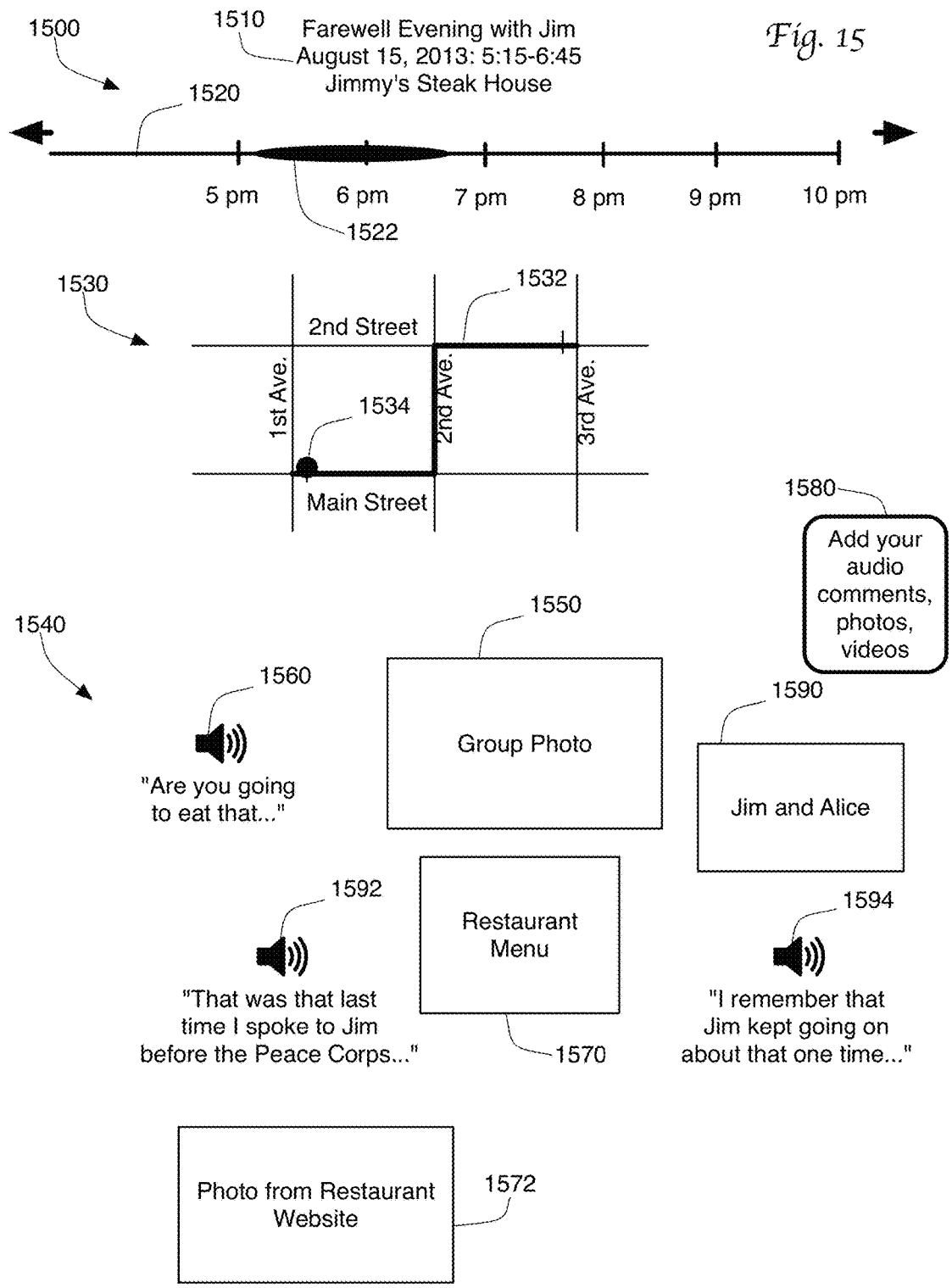
FIG. 15 is a schematic diagram of a second embodiment of a user interface showing an event of a presentation grouping.

FIG. 15 shows an interface 1500 for an event from a different presentation grouping. In this case, the event 1620 is from a "Farewell Evening with Jim" presentation grouping 1600 (see FIG. 16). This event 1620 took place from 5:15 to 6:45 on Aug. 15, 2013, as indicated by marker 1522 shown on timeline 1520. This event occurred on the corner of Main Street and 1st Avenue (Jimmy's Steak House), as shown by the marker 1534 on the path 1532 added to the map 1530.

The only explicit content 136 taken during this event 1620 was a group photo 1550 of the four friends at this restaurant. In addition, the mobile device 100 was allowed to record periodic conversation snippets, with at least one snippet 1560 being interesting enough to place on interface 1500. The server 180 searched for locations of interest at this geographic location 1534 and identified the restaurant. The server 180 was able to retrieve a restaurant menu 1570 and a photograph of the dining room from the restaurant's website 1572 and use this to augment the content area 1540 in interface 1500.

This interface 1500 differs from interfaces 1300, 1400 by the inclusion of a viewer-directed button 1580. While the user of the mobile device 100 and the identified user 260 from database 200 is allowed to edit presentation groupings and events, and to format their presentations in the interfaces 1300, 1400, 1500, the primary purpose of these interfaces 1300, 1400, 1500 is to allow other people to view this content. These viewers are not generally allowed to change the content in an event or change the formatting of an interface. However, through the use of a viewer content addition button 1580, these viewers can add content to an event. In this case, viewers added photograph 1590, and provided audio notes 1592 and 1594.

Figure 16:
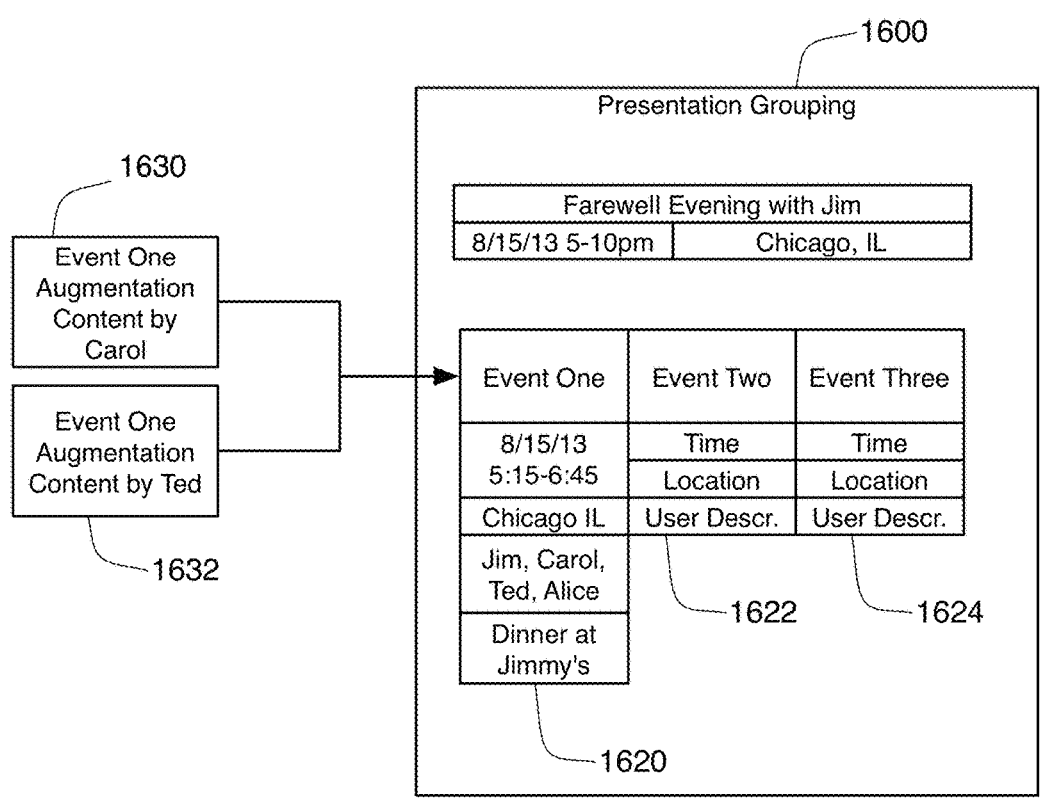
FIG. 16 a schematic diagram showing viewer augmentation of events.

As shown in FIG. 16, the presentation grouping 1600 included event one 1620 along with two other events 1622 and 1624. Each event 1620, 1622, 1624 is associated with explicit content 136 and implicit content 138 and various metadata derived from this content 140 and other items such as calendar data 412 or data from event data sources 187, 188, and 190. As shown in FIG. 16, the server 180 can also allow viewers to add viewer augmentation 1630, 1632 to these events 1620. These additions 1630, 1632 can be stored along with the other event content 140. In a preferred embodiment, the content area 1540 will automatically regroup content to reflect viewer added content 1590-1594, although the user that created the presentation grouping 1600 would be allowed to change such formatting. In some cases, the viewer augmentation 1630, 1632 is related to an event 1620 only in the context of this particular presentation grouping 1600. For example, this same event 1620 could also be included in a presentation grouping around the topic of "my favorite restaurant meals." In this context of this presentation grouping, the comments and contribution by Carol 1630 and Ted 1632 would be inappropriate.

In one embodiment, all of the events (such as events 1620-1624) in a presentation grouping 1600 are displayed automatically, one after another. In this embodiment, it may be helpful to have audio clippings associated with an event 1620 to begin playing immediately when the event 1620 is first displayed. The interface 1500 may automatically move to the next event 1622 when all of the content in the first event 1620 has been displayed or played. In this embodiment, the audio clippings can be telling the story of the presentation grouping as each event 1620-1624 is presented. The creator of the presentation grouping 1600 can effectively tell the story for that presentation grouping 1600 through the audio clippings and commentary that have been added to the interface 1500. As explained above, some of this audio content may have been recorded at the time of the event, while other portions of the audio content may be added later to supplement the content 140 recorded during the event.

In this environment, audio augmentation 1630, 1632 that is provided by a viewer of the interface 1500 may not be easily integrated into the story told by the creator of the presentation grouping 1600. Nonetheless, this audio clipping may be of interest to other viewers that may want to hear the story from a different point of view. As a result, the interface 1580 will accept viewer augmentations and then allow later viewers to choose which commentary they hear as they watch the presentation of an event 1620. Users may also be able to choose different sets of visual content to see as well. For instance, FIG. 12 could present the story of saying goodbye to Jim from Jim's friends' perspective. Jim may later add his own audio commentary, photographs, and movies from that night that would tell the story from his perspective. The interface 1500 could group this content into two perspectives, letting viewers choose which experience they wish to have of the event 1620.

Group and Organizational Sharing of Data

In addition to manually allowing viewers to add additional content 1590-1594 to events, it is also possible to allow users of the server 180 to control the sharing of content with one another. For instance, if user one created content at an event, such as an 18th birthday party for her friend John, that user could create a presentation grouping 1700 that included that event 1710, as shown in FIG. 17. As part of that event 1710, the user created content A 1712, B 1714, C 1716, and D 1718. This content 1712-1718 is stored as content for this event 1710 in database 200. A second user may have also attended the same party and created their own presentation grouping 1720 containing their event 1730 for the party. The second user created content E 1732, F 1734, and G 1736 for this event 1730.

As both events 1701, 1730 would be associated with metadata indicating that they occurred at the same time in the same location, the server 180 might recognize the two events 1710, 1730 as related. Furthermore, assuming that the first user had agreed to share their event definitions with the second user, it is likely that content clustering method 900 would have used the metadata for event 1710 to create the second event 1730. This occurs because the first user stored their event 1710 in the database 200 and allowed sharing of the event definition, which caused this event 1710 to become available as a suggested event in the crowd-sourced events 188 provided by the server 180. When the second user clusters their content 1732, 1734, and 1736 through process 900, the server 180 will suggest that the content be combined as a "John's 18th Birthday Party" content cluster 220 based on the crowd-sourced event definitions 188 made available by the first user. Alternatively, the event definition for event 1710 could have been made available by the first user for download to the media organization data 139 found in the second user's mobile device 100. Either way, the data is made available to the second user for content clustering, and the app would then request that the second user confirm the cluster 220 as a "John's 18th Birthday Party" event 230.

When the first user elects to display their event 1710 (or format the event for later display to third parties), the server 180 may recognize that the database 200 already contains content 1732-1736 from the same event that was submitted by the second user. Assuming that it has permission from the second user, some of this content 1732-1736 could be used in presentation 1740 of the first user's event 1710. In particular, content E 1732 is shown in FIG. 17 as being included in the display 1740 of event 1710 without change. Content F 1734 may have been kept private by the second user, and therefore would not be made available to anyone else. Content G 1736, however, was merged by the system with the first user's content C 1716 to form merged content C+G 1750. This merged content might be a single video file 1750 containing video from content C 1716 and content G 1736. Alternatively, the merged content might be a panoramic picture merging two separate photographs.

In this way, content from numerous multiple users at the same event could be made available for other users. The server 180 provides an interface that allows a user to pick and choose among the available content for inclusion in their presentation 1740. This interface may also allow a user to merge dozens of separate pictures into a single panorama photograph. For instance, many photographs may be available for a large concert event attended by thousands of users. The server 180 could make these photographs available for selection and use by the other users of the server 180 that are creating a presentation grouping containing that event. In fact, the server 180 could distinguish between content based on the content's precise location. At a stadium concert, for instance, the server 180 could limit content suggestions that it makes to a user to include only that content that was taken from the same approximate location within the stadium as that first user, so that the suggested photos and videos would be similar to the first user's actual view of the concert.

In the context of FIG. 17, the first and second users may have actually attended the party together. In this case, it may be that these users desire to merge all of their content together into a single presentation 1740 of the event. A single formatting would apply to the combined event, allowing both users to jointly create and format the presentation of the content for that event. Alternatively, as explained above, the presentation can include two perspectives of the event that a viewer can later select, with the content and commentary of the first user creating a first perspective and the content and commentary of the second user creating a second perspective.

Figure 18:
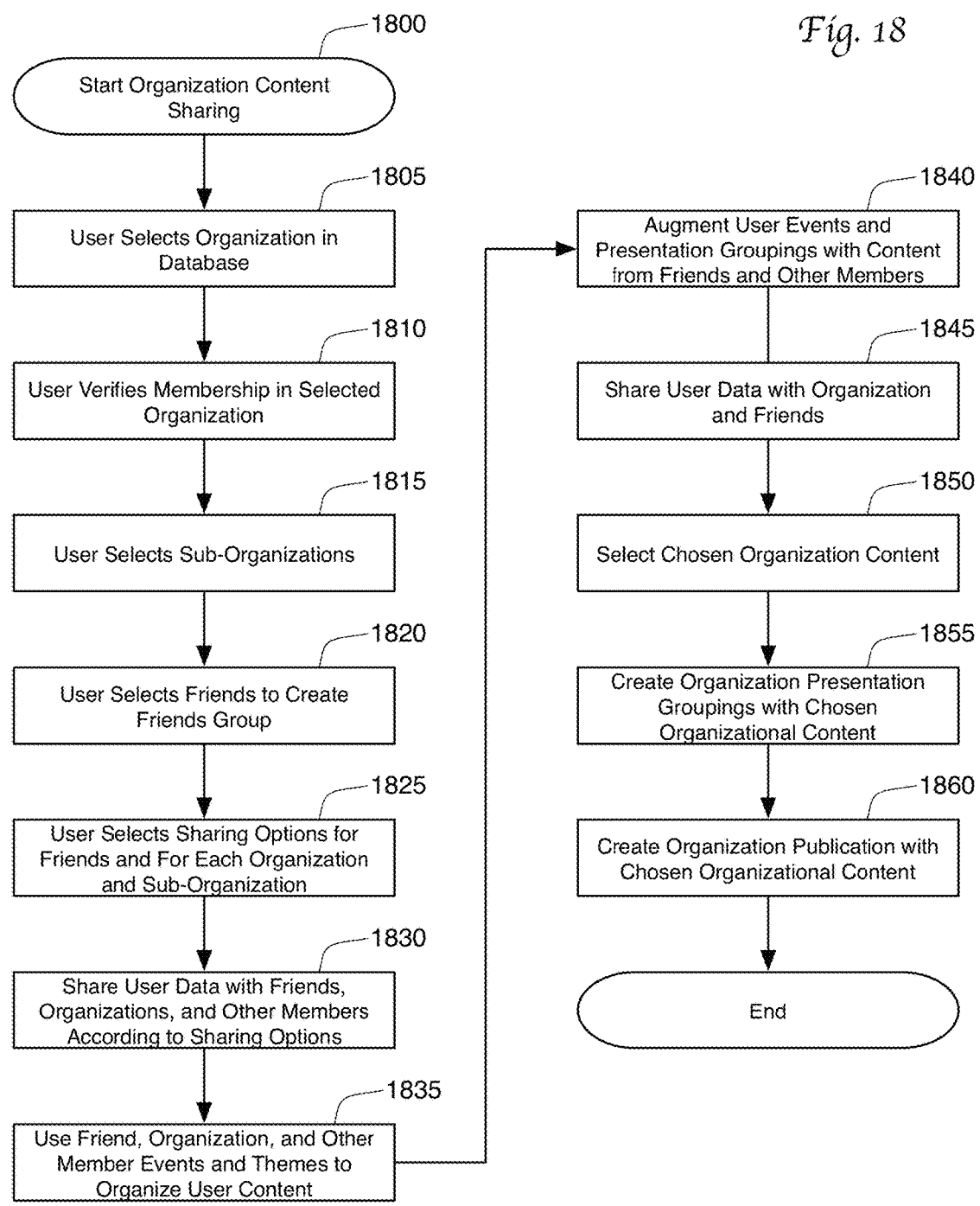
FIG. 18 is a flow chart showing a method of sharing content within an organization.

FIG. 18 shows a method 1800 by which users can agree to share content items 200, and event definitions 230 with one another. In this method 1800, the user can control such sharing based on the organizations 290 and friend groups 262 that are established in the database 200. The method starts at step 1805, in which a user 260 uses the server 180 to select one or more organizations 290 with which the user wishes to be associated in the database 200. For example, a student at Lincoln High School may wish to identify himself or herself as a student at that high school. At step 1810, the user verifies that he or she is a member of the high school. Verification of membership in the organization can be accomplished by providing security information to the server 180, such as a password that would be known only to students at the school. In other embodiments, the school itself identifies the students and teachers 260 that are to be considered members of the school within database 200. Once a user 260 is associated with an organization 290, it may be possible to self-identify with a variety of sub-organizations 290 at the school at step 1815. In the example shown in FIG. 3, the student is a member of the Lincoln High School organization 300 and sub-organizations relating to the football team 310 and the debate team 320. At step 1820, the user 260 identifies other users 260 as friends 262 in order to create a group of friends 330 for that user 260.

At step 1825, the user 260 is allowed to establishing sharing options for each of the organizations 290 and friends 262 with which they are associated. For instance, the student may choose to share all of their content items 210 and event definitions 230 with their friend group 330. The same user 260 may determine that they wish to share some but not all of their content with the organizations 300, 310, 320 of which they are a member. The preferences created by the server 180 may specify that the no content items 210 be to be shared with these organizations 290 and their members unless the user 260 has specifically authorized this sharing on a content item 210 by content item 210 basis. Alternatively, the user may wish to share debate team related photographs with the debate team 320, and football team related photographs with the football team 310. In this case, the server would identify those content items 210 that have belong to an event 230 that is linked to a predefined event 292 for that organization 290. Thus, photographs 210 from the Northfield, Minn. debate tournament will be associated with the predefined tournament event 292 created by the debate team organization 290 and therefore those photographs will be automatically shared with other users 260 that belong to the debate team 290.

At step 1830, new content items 210 that are clustered 220 and associated with events 230 are then shared according to the sharing options selected in step 1825. In addition to the content items 210, metadata relating to the events 230 may be shared with other users as crowd-sourced events 188 according to the desired preferences of the user 260. For example, a user may choose to share all of their event metadata with their friends group 330, but none of the event metadata with their organizations 300, 310, 320. As explained above, this shared metadata can be stored on the media organization server 180 as a crowd-sourced event 188 for sharing with others, or for downloading to the mobile device 100 of an identified user or group of users for storing in the device's media organization data 139. In either case, the sharing will be subject to the privacy preferences established by the creating user.

In addition to sharing the user's own content, association with an organization 300, 310, 320 or friends 330 allows a user to take advantage of other content and event definitions stored at the server 180 or previously downloaded to the user's mobile device 100. In step 1835, the user 260 utilizes crowd-sourced event definitions 188 and themes 270 that are associated with their organizations 290 (such as 300, 310, and 320) and friends 262 (330) to organize their own content items 210. In step 1840, actual content 210 from other members of the organizations 290 or friends 262 (330) are used to augment the user's events 230 and presentation groupings 240.

In addition to sharing content items 210 with other users 260, the preferences established at step 1825 determine whether or not the user 260 will share those content items 210 with the user's organizations 290 and friends 262. If allowed by those preferences, these items are shared at step 1845. For instance, Lincoln High School might organize a senior prom predefined event 292 and request that students share their content items 210 from that event with the school 290. The authorization to share content with the school as established at step 1825 may include a license to reproduce the content by the school. Such content may be shared not only with other users 260 but may also be used by the organization outside of the context of the media organization server 180. For instance, the school may select the user's content items 210 for inclusion in a school newspaper or yearbook, or on the school's web site or on the school's Facebook page (provided by Facebook, Inc. of Cambridge, Mass.). Alternatively, a group of users may organize a summer party and agree that all content from the party will be shared between members of an ad hoc organization created by one of the users for that party.

Because the organization 290 may receive a great deal of shared content from its member users 260, step 1850 involves filtering that shared content down into a few "selected" content items 210 that might be used by the organization. In one embodiment, the members of that organization help determine which of the shared content items become selected items. For instance, the organization may select for use those content items 210 that are most often selected by members for augmenting their own events 230 and presentation groupings 240. In another embodiment, the organization 290 allows members to vote on the contributed content 210 through an interface provided by the media organization server 180. In yet another embodiment, a select group of individuals (such as the high school yearbook staff) determine which of the contributed content is selected for use by the organization as a whole.

The selected content is then used by the organization 290 to create a presentation grouping 240 for the organization 290 in step 1855. This presentation grouping may then be viewed by members 260 of that organization 290, or by the public at large. Alternatively, or in addition, the organization 290 may use the selected organization content to create a printed publication that is distributed to its members or to the public in step 1860, after which the method 1800 will end. In the example of the Lincoln High School prom, the actual dance may occur after the yearbook for the school has been printed. The process 1800 shown in FIG. 18 would allow the yearbook staff to accumulate photographs and other media content 210 from students 260 that attend the school 290. This content 210 is then used to create a presentation grouping 240 of the event that is available over the Internet 170 through server 180, or even to create a yearbook addendum publication that is printed and distributed separately from the yearbook. The publication can be printed on physical paper based on one or more digital image files created by the server 180 from the selected organization content.

Presentation Method

Figure 19:
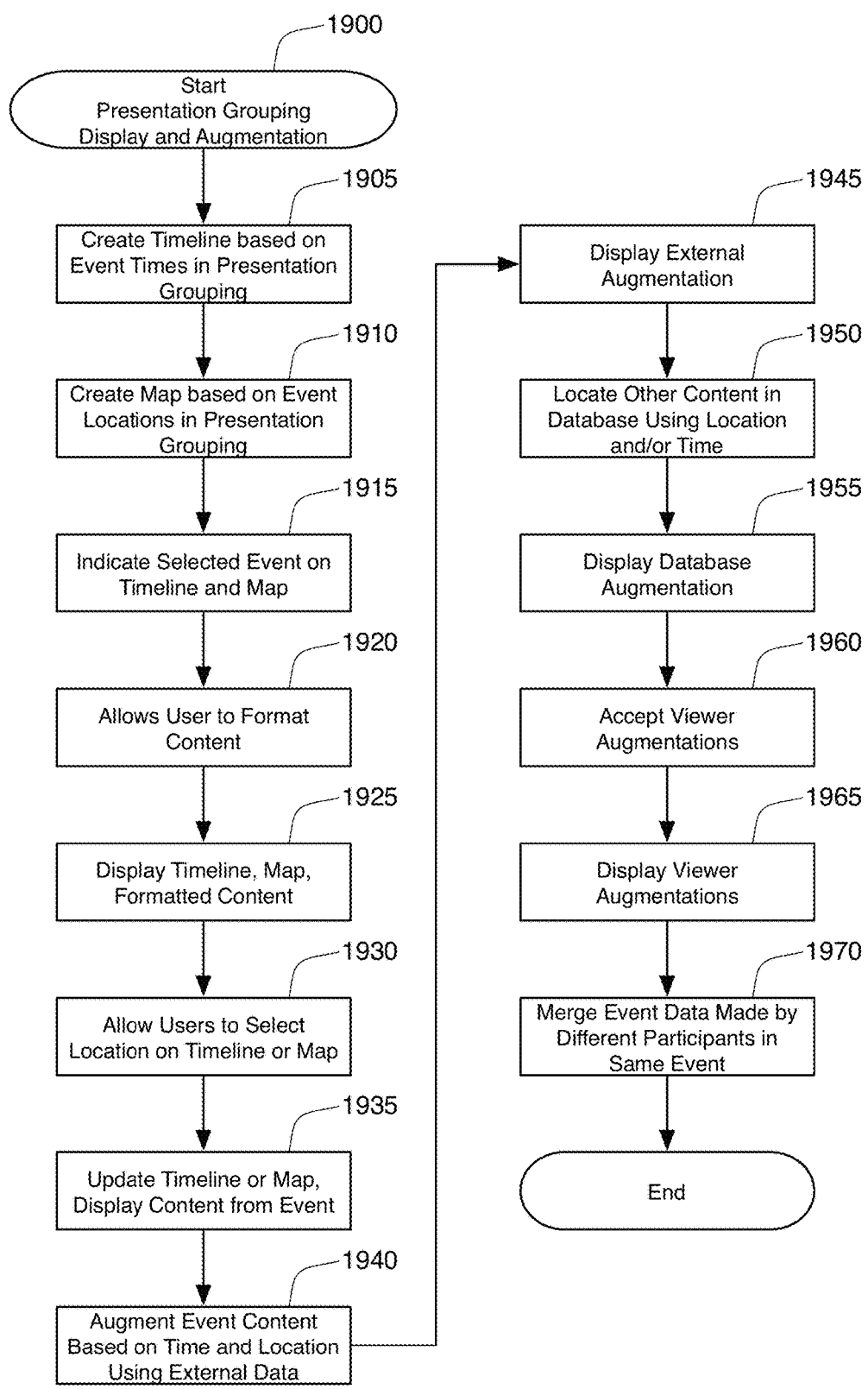
FIG. 19 is a flow chart showing a method for displaying and augmenting a presentation grouping.

A method 1900 for presenting content items 210 from a presentation grouping 240 is shown in FIG. 19. This method 1900 starts at step 1905 by creating a timeline. To do this, the method 1900 examines the event times for the events 230 in the presentation grouping 240. The timeline should extend from the first event 230 chronologically to the last, although the entire timeline need not be displayed on the user interface. At step 1910, the method 1900 creates a map based on the location information found in the events 230 in the presentation grouping 240. This map may utilize third-party mapping software to place the event locations on the third-party map. As explained above, the server 180 can create a path on the map by linking the event locations together. The server 180 can intelligently create the path by noting important physical features (such as roads or rivers) that link the locations together.

In one embodiment content is displayed one event at a time. At step 1915, the timeline and map both display an indication of where the selected event occurs on the map, timeline or both. Note that if a user wished to include content from multiple events at the same time, the user could simply merge the two events into a single event. Alternatively, the server 180 could maintain the two events as separate events, but simply allow the user to display content from both events together. In this case, the timeline and map could display information for both events. Alternatively, the timeline and map could be removed from the display.

At step 1920, the user formats the content 210 from the event 230 for presentation. In addition to organizing the layout of content, the formatting could include special effects, distortions, animations, or color filters that could be added to particular items of content. In addition, the user could specify music for the event or the entire presentation grouping 240. These formatting changes can be saved with the event so that all viewers would see the same formatting. In other circumstances, formatting options would be available for viewers so that they can alter the presentation of the presentation grouping 240. These changes would not be made available to other viewers, but could be saved along with an identifier for that viewer so that the same viewer could save their formatting preferences.

At step 1925, the timeline, map, and formatted content for an event 230 are displayed to the viewer. The viewer can then select at step 1930 a location on the timeline or map to select a different event 230. At step 1935, the display is updated to the selected event 230 by updating the map and timeline, as well as the event content items 210.

At step 1940, the server 180 uses time and location information for the event 230 to gather augmentation content from external servers 194. This augmentation is displayed with the original content in step 1945. At step 1950, the same time and location information allows the server 180 to look for related content in its own data 186 from events 230 created by other users. Assuming that these other users have granted permission to share this content 210, any discovered content 210 is shared at step 1955. At step 1960, the server 180 allows viewers to submit their own augmentations, such as photographs or commentaries that they wish to add to the event presentation. At 1965, these viewer-submitted augmentations are displayed for all viewers to see. Finally, at step 1970, the server 180 may determine that two users are willing to merge content 210 from their own events 230 with the other user. If so, the content 210 is merged so that the two users can collectively define and format a single event 230.

Steps 1940-1970 can take place at different times in method 1900. For instances, these steps 1940-1970 could take place before step 1905, so that the timeline and map would reflect all the augmented data that was added to the event. Alternatively, some or all of these steps could occur before step 1920, which would allow the user to include the augmentation content in their desired format for the presentations grouping. In addition, none of steps in method 1900 should be considered mandatory, as various steps could be skipped without fundamentally changing the method 1900.

Themes

As explained above, the database 200 includes theme database items 270 that are associated with formatting instructions 280 to guide formatting of presentation groupings 240. Themes 270 may be based on a life event (wedding, end-of-life, graduation, new baby, etc.) or family vacation (cruise, road trip) or other commonly shared life experiences (child's soccer season, freshman year at college, moving to a new house, a soldier's time in the army etc.). The themes 270 for these events would provide more than color choices and suggested background music. In the preferred embodiment, the themes 270 are designed to help a user tell a story.

Professionals may identify the various events that are typically associated with a theme and create corresponding theme events 272 in the database 200 for the theme 270. For instance, a "moving to a new house theme" 270 may include a "house search" theme event 272, a "signing the purchase contract" theme event 272, a "closing" theme event 272, a "moving day" theme event 272, and a "housewarming" theme event 272. The best manner to present these theme events 272 can be considered by a professional in order to best tell the story of a family's new home. This may include ordering these events in an effective fashion, incorporating stock imagery, inserting humor, etc. In particular, the professional may have particular ideas about the kind of content that can help tell the story. For instance, it may be helpful to have a photograph of the family's new home with the "sold" sign still in front as part of the "house search" event 272, and a picture of the home owners waiting for the real estate agent after signing the purchase agreement for the "signing the purchase contract event" 272, and a picture of the moving van with boxes for the "moving day" event 272. These elements can be added to the theme 270 by defining theme content suggestions 274 for the various theme events 272. If the professional designing the theme 270 can help select the content items 210 that will make up the presentation groupings 240, the formatting 280 for the theme 270 will be that much more effective. In effect, the theme 270 (with the theme events 272, theme content suggestions 274, and formatting 280) actually helps define the story elements that make for an effective presentation of the user's own story. By suggesting content 274 and events 272 for the various story elements in the theme 270, the server 180 will help even uncreative people feel creative.

Themes 270 can be assigned to a presentation grouping 240 automatically. By examining the events 230 in a presentation grouping 240, the server 180 can identify information about those events 230. For instance, if all or most of the events 230 in a presentation grouping 240 contain metadata titles or descriptions relating to soccer games, a theme 270 that was designed for presenting a sporting team's season could be assigned to that presentation grouping 240. Similarly, a presentation grouping 240 that contained events 230 labeled "wedding shower," "groom's dinner," "ceremony," and "reception," would be assigned to a wedding theme 270. In the preferred embodiment, the server 180 confirms the assignment of a suggested theme 270 to a presentation grouping 240 before applying the formatting 280 to the presentation of the presentation grouping 240.

Figure 20:
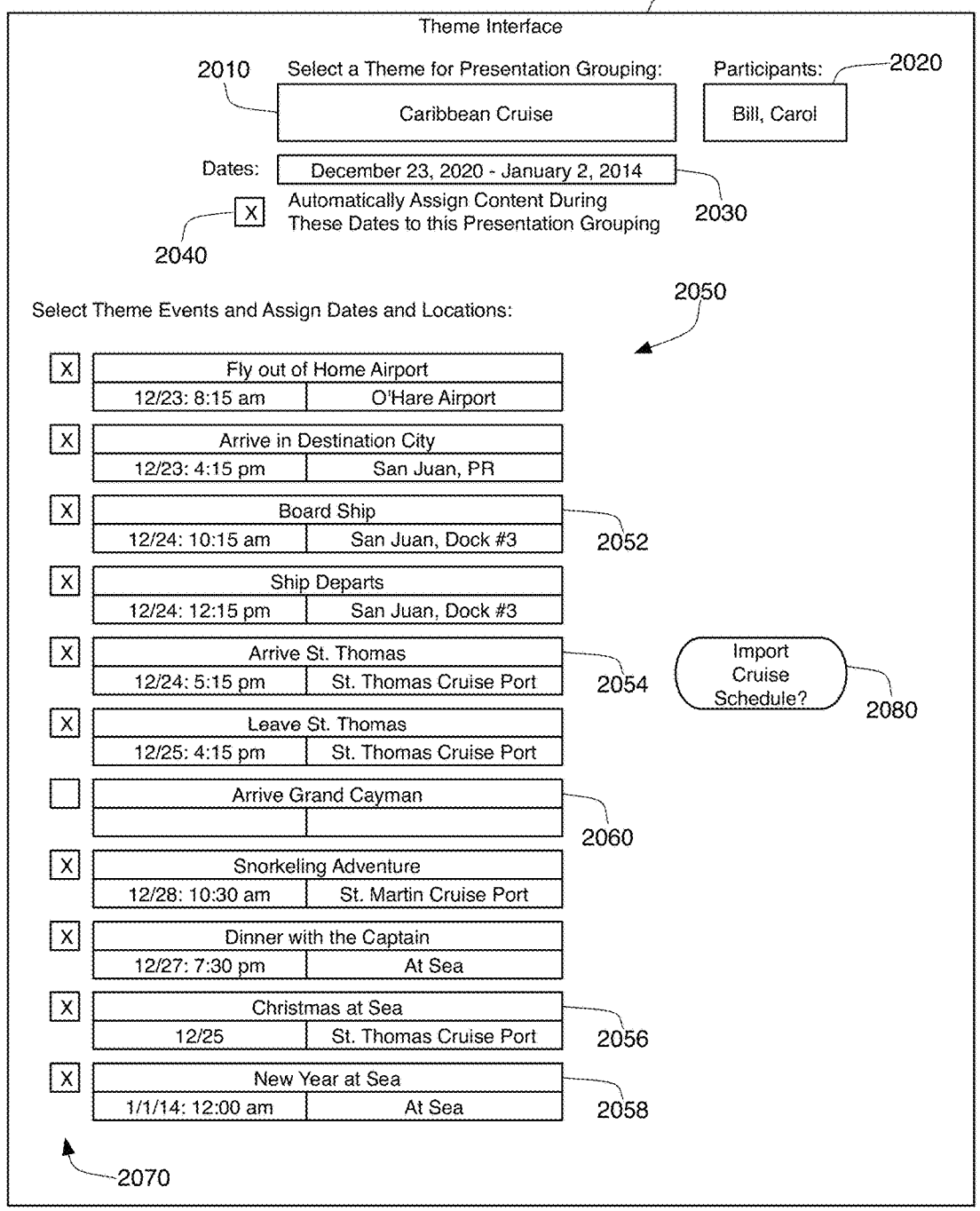
FIG. 20 is a schematic diagram showing a theme selection computer interface.

Themes 270 can also be manually selected by a user, as shown in theme interface 2000 shown in FIG. 20. In this case, the user is selecting a theme 270 for a future vacation. The user begins by selecting one of the pre-established themes 270 through interface 2000. In this case, the user selected a Caribbean cruise theme 2010. The themes 270 that are available for selection by the user can be presented in a variety of ways, such as through a pull down menu, a search interface, or a structured hierarchy of options. When a theme 270 is selected for a future life event, the server 180 will create a new presentation grouping 240 that will be organized and formatted according to the theme 270. Alternatively, the user can manually assign the theme 270 to an existing presentation grouping 240 of already existing events 230 and content items 210.

Through interface 2000, the user can also specify the participants 2020, and the time frame 2030 for this cruise. At element 2040, a check box is provided that, if selected, will cause the server 180 to automatically assign content 210 taken by the user during time frame 2030 to the presentation grouping 240. When the Caribbean cruise theme 2010 is selected, the interface 2000 will present to the users the theme events 2050 that are have been pre-defined for the elected theme 2010. In this case, the theme events 2050 all are common events that may be encountered during a Caribbean cruise, including boarding the cruise 2052 and arriving in the harbor at St. Thomas in the US Virgin Islands 2054. In addition, the server 180 ideally will identify special events that apply to the participants 2020 or the particular dates selected 2030 that may not apply in other instances of the theme 2010. For instance, in interface 2000 the listed theme events 2050 include Christmas at Sea 2056 and New Years at Sea 2058 because the specified date range 2030 included both of these holidays. If the interface 2000 identified the participants 2020 as a romantic couple, the included theme events 2050 might be different that if the participants 2020 were a family with children.

Each of the events 2050 are displayed in interface 2000 because the events 2050 are identified by theme event database entities 272 that are associated with the theme database entity 270 that was chosen at element 2010. Of course, not all of these elements 2050 are applicable to every Caribbean cruise. For instance, in this cruise Bill and Carol will not be visiting Grand Cayman 2060. To identify which of these suggested theme events 2050 are applicable to the user's planned vacation, the user can select or deselect particular events through checkboxes 2070. In interface 2000, the checkbox for the Grand Cayman arrival 2060 is unchecked. For each of the relevant events 2050 listed, the user is requested to enter a date and time for the event 2050, and a location for the event. For instance, for the Board Ship event 2052, the user indicated that this will occur on Dec. 24, 2013 at 10:15 am at San Juan cruise ship dock number 3. Although the server 180 allows the user to enter and edit this time and place information manually, automated assistance may be available in some cases. For instance, by selecting button 2080, the user can identify a particular cruise, and the relevant events 2050 will be selected and the time and date information will be inserted using publicly available information about that cruise.

Figure 21:
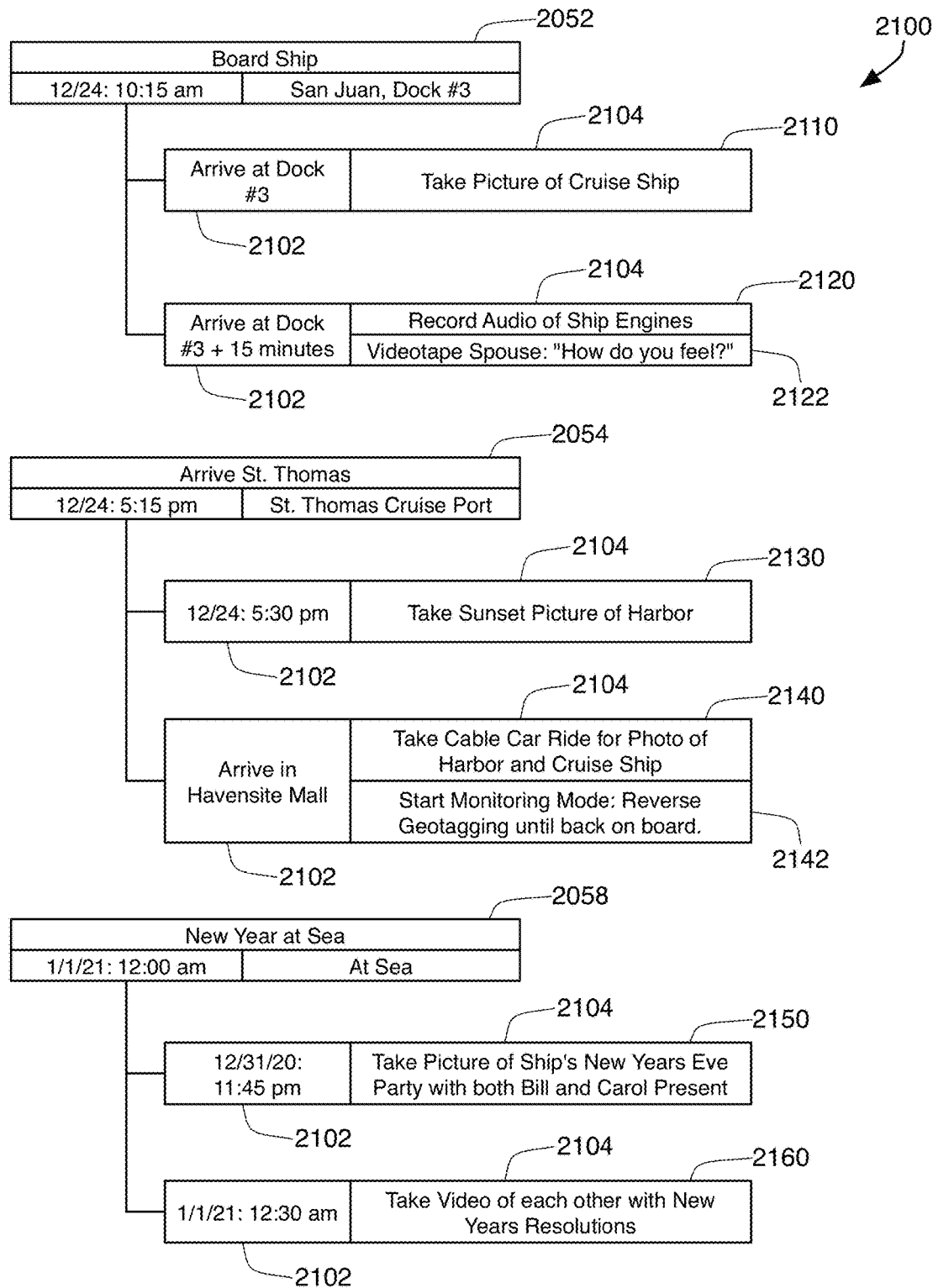
FIG. 21 is a schematic diagram showing the relationship between theme events and theme content suggestions.

Time and place information stored about upcoming theme events 272 can be used to help users create suggested theme content 274. As shown in FIG. 21, theme events 2052, 2054, and 2058 are associated with theme content suggestions 2110-2160. For example, the board ship theme event 2052 is associated with three theme content suggestions 2110-2122. Each theme content suggestion 2110-2160 shown in FIG. 21 contains two parts, a trigger portion 2102, and a content portion 2104. For the first suggestion 2110, the trigger 2102 is arriving at dock number three of the San Juan cruise ship port. In this case, the trigger 2102 is the arrival at a particular geographic area. This is considered a trigger 2102 because the preferred embodiment uses this information in order to prompt the user to acquire the suggested content 2104. If these content suggestions 2110-2160 are stored in, or accessible from, a mobile device 100, the media organization app 134 (or another, specialized app) can use these triggers 2102 to prompt the user to obtain the content 2104. The trigger 2102 can be defined as a geo-fence, in which the GPS sensor 158 (or other location sensors 150) monitors the location of the mobile device 100 and responds when the mobile device is at or near the predetermined location. In the examples of suggested content 2110, when the mobile device approaches dock #3 of the San Juan cruise ship port, the media organization app 134 will alert the user (using, for example, an audible sound or a vibration) and show to the user on display 110 a request to obtain the suggested content 2110. Alternatively, the media organization app 134 can monitor the mobile device 100 to identify when the users is making use of the device, and then request the suggested content 2110 at that point. For example, when a user answers or initiates a phone call on the mobile device 100, at the conclusion the app 134 can leverage the fact that the mobile device 100 has the user's attention and can prompt or remind the user of upcoming events 2052 or request suggested content 2110. If the user proceeds to take photographs using the mobile device 100 within a set period of time after the trigger event (e.g., within ten minutes), the media organization app 134 will associate the created content items 210 with this particular theme content suggestion 274 (such as suggestion 2110). This means that this photograph will appear within the formatted presentation grouping display automatically in the area that the professional who designed the theme 2010 intended without requiring any further interaction from the user. If multiple photographs were taken at this time, or if two theme content suggestions were pending at the same time, the app 134 may request that the user identify which theme content suggestion (if any) should be associated with the new content items 210.

Suggested theme content 2120 and 2122 also are associated with board ship theme event 2052, but they both relate to a different trigger 2102. Here the trigger is set for fifteen minutes after arriving at the specified location of the event. Consequently, 15 minutes after arriving at the cruise ship dock, the mobile device 100 will request that the user record audio of the ship engines as they stand outside waiting to board the ship. The mobile device 100 will also request the user to videotape their spouse's response to the question "how do you feel?" Theme event 2054 similarly has three associated media content suggestions 2130, 2140, and 2142. Suggestion 2130 contains a time-based trigger set according to the time of the local sunset. Theme content suggestion 2140 suggests that the user visit a local tourist attraction, namely the cable car ride to the top of a high hill. In effect, this theme content suggestion 2140, which is triggered when the visitor enters a particular area of St. Thomas, is acting as a tour guide. When the user disembarks and enters the Havensight Mall area, their mobile device 100 will alert them to an interesting activity 2140. In addition, the same trigger 2102 of arriving at Havensight Mall can also trigger a monitoring mode at step 810 for the gathering of implicit content 138. In this case, the trigger 2102 causes the mobile device 100 to enter geotagging mode, allowing the device 100 to track the movements of the user while on the island. The monitoring mode will stop the geotagging when the user returns onboard the ship. Finally, theme content suggestions 2150 and 2160 utilize a time trigger 2102 based directly on the time of the theme event 2058, with theme content suggestion 2150 being triggered fifteen minutes before theme event 2058 and theme content suggestion 2160 being triggered thirty minutes after theme event 2058.

FIG. 22 shows how formatting instructions 280 in database 200 can be applied to different components of a theme, including the theme database entity 270, theme events 272, and even individual theme content suggestions 274. As shown in FIG. 15, the overall screen format 2212 and the text font and color scheme 2214 formatting instructions apply to the overall theme 2210. Theme event one 2220 and two 2260 are associated with different background music 2222, 2262, respectively, and are associated with different layouts 2224, 2264, respectively. The three theme content suggestions 2230, 2240, and 2250 are also individually formatted. Formatting instructions 280 can take a variety of forms, including the ordering of the appearance of events 2220, 2260 or content 2230, 2240, 2250. Formatting instruction 2232 requires that suggested content 2230 be presented first, while formatting 2242 changes the background music while presenting content 2240 second. According to formatting instructions 2252, suggested theme content 2250 is presented third and in a large size.

Application of Organization Theme to Presentation Grouping

Figure 23:
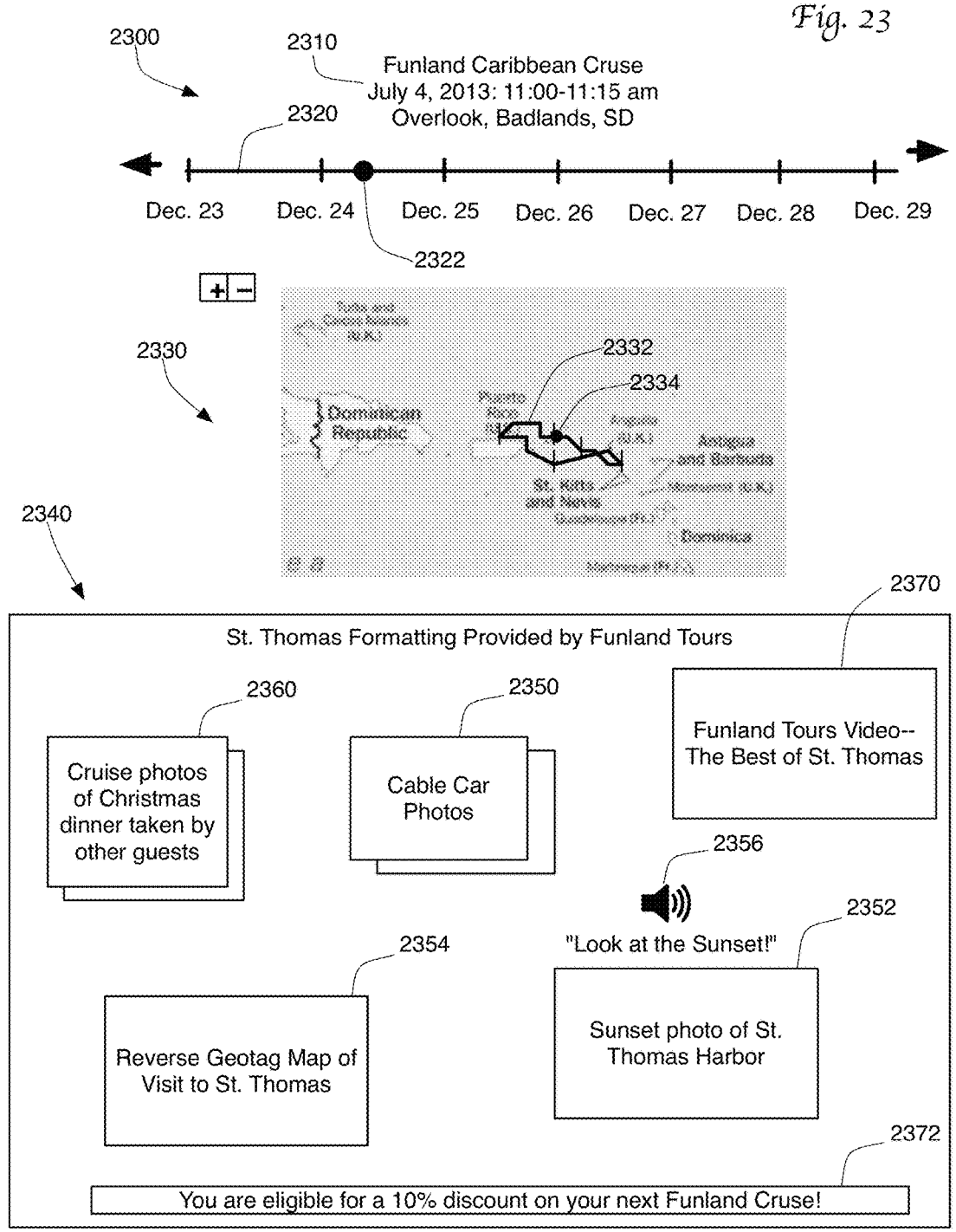
FIG. 23 is a schematic diagram of a third embodiment of a user interface showing an event from a presentation grouping displayed according to a theme provided by an organization.

FIG. 23 shows an interface 2300 for viewing a presentation grouping 240 that has been formatted according to a theme 270. In this case, a cruise ship organization 290 has created this theme 270 and made it available to their cruise ship passengers, who are associated in the database 200 as user 260 members of the organization 290. This interface 2300 is similar to the interfaces 1300, 1400, and 1500 discussed above, in that this presentation interface 2300 includes a timeline 2320 and a map 2330. The timeline 2320 shows the duration of the cruise with an indicator 2322 used to identify a time for a selected event, and the map 2330 shows the path 2332 taken by the cruise ship with an indicator 2334 showing the location of the selected event.

In FIG. 23, a professional hired by the cruise company may have created the theme 270 to help the passengers tell the story of their cruise. This professional created the formatting for the theme and the theme events, including particular formatting for the content area 2340 of the St. Thomas event shown in FIG. 23. The professional may have decided that the St. Thomas content area 2340 might look best with a sunset photo taken in St. Thomas Harbor, photographs of the passengers enjoying the cable car adventure, as well as a reverse geotag map of the island showing where the passengers traveled during their visit to the island. As a result, the professional would not only create the theme content suggestions 2130, 2140, and 2142 described above, but may have laid out the content location area 2340 of interface 2300 with specific locations designed around these theme content suggestions 2130, 2140, 2142. In FIG. 23, the passengers did acquire content for all of these suggestions, so the cable car photos 2350, the sunset photograph 2352, and the map 2354 taken from the reverse geotagging trail are all presented in area 2340 as originally designed by the professional. In some cases, the users 260 may not desire to obtain any or all of these content items 210, so the theme 270 would have to be flexible enough to accept missing or replacement content. The theme 270 also allows users to add their own content to the presentation 2300, such as the audio content 2356 describing the sunset. In the preferred embodiment, the professionally designed theme 270 would create a starting point for the display of a presentation grouping 240, and would allow user to edit and change the look of interface 2300.

Because the passenger who took the cruise is associated with the cruise ship organization that hosted the cruise, the database 200 will associate the passenger's user database record 260 with the organization record 290 for the cruise company. Other passengers on the same cruise may be considered co-members of the organization 290, and therefore the server 180 can facility sharing of content and event definitions among co-members and the organization as described above. In FIG. 23, cruise photographs 2360 taken by other guests can be reviewed by the user 260 and included in interface 2300. The user 260 may also choose to utilize content provided by the cruise company 290, such as the video of St. Thomas 2370 shown in FIG. 23. Similarly, the passengers may chose to share their content and event definitions relating to the cruise with their co-passengers and with the cruise organization itself.

In some circumstances, the organization 290 that creates a theme 270 may wish to locate mandatory content within their theme 270. In FIG. 23, the cruise company has inserted a promotional message 2372 as a mandatory part of the theme 270, meaning that while users 260 can alter the content and formatting of other parts of the theme 270, they may not alter or remove the mandatory content 2372.

Theme Method

Figure 24:
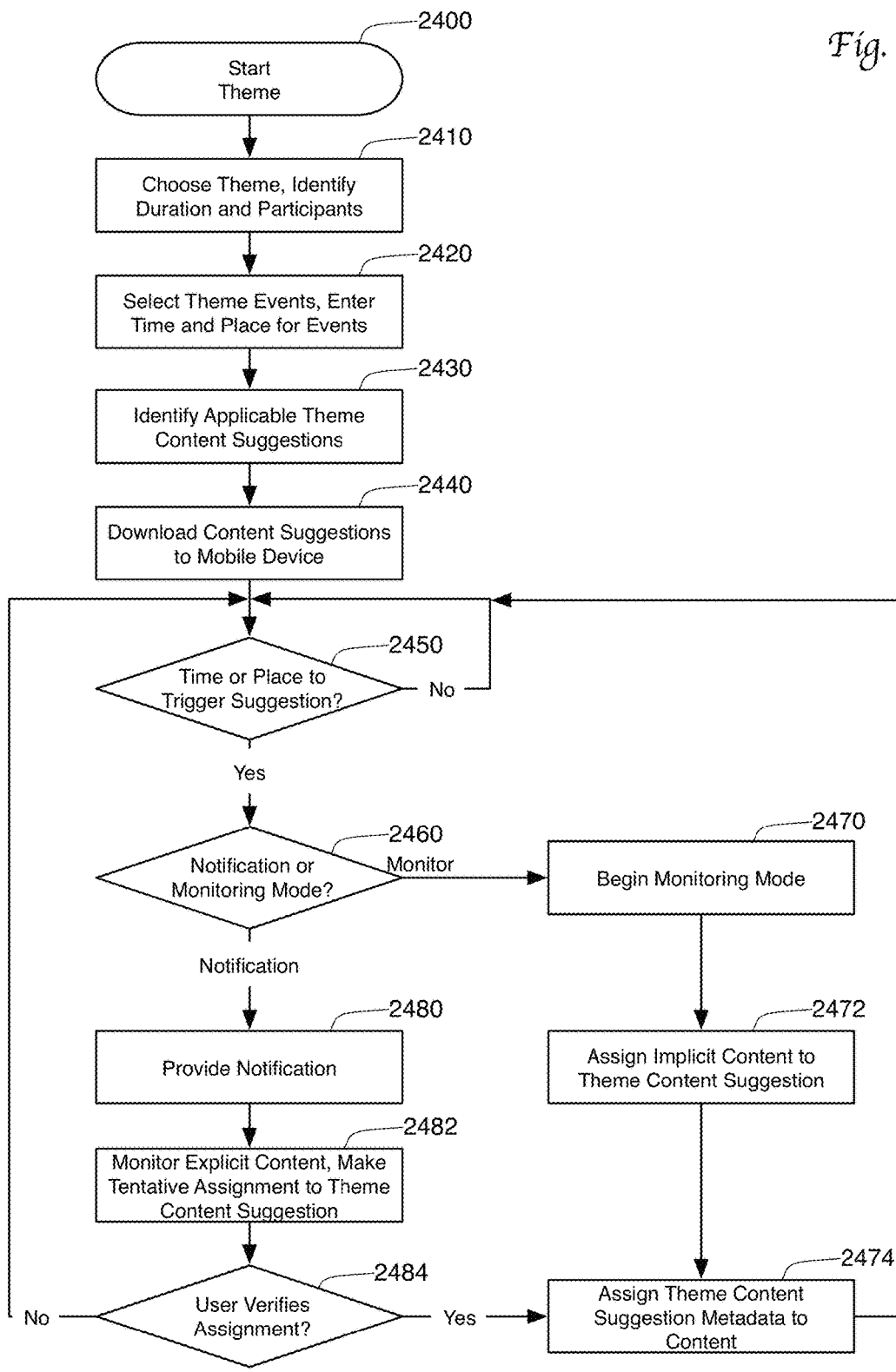
FIG. 24 is a flow chart showing a method of assigning content to a theme content suggestion.

Themes can be implemented using the method 2400 shown in FIG. 24. This method 2400 starts at step 2410 by allowing a user to select a theme 270 for a presentation grouping 240, and to identify the duration and participants for this presentation grouping 240. Once the theme 270 has been chosen, a user interface can present theme events 272 that are associated with that theme in the database 200. The user can select relevant theme events 272, and for each relevant theme event 272 enter an expected time and place for that event 272 (step 2420). In some circumstances, a user may be able to import this information, but more typically the user will enter the dates and times manually. In other circumstances, the theme 270 will be created by an organization 290 that creates predefined events 292. A user 210 planning to attend those events 292 may utilize the organization's themes 270 to organize and present the content 210 from those events 292. In this case, the organization 290 may be able to prepopulate the expected time and place for the theme events 272. At step 2430, the method 2400 will identify theme content suggestions 274 for the selected relevant theme events 272. These suggestions 274 may be associated with triggers that are calculated based on the time and/or place assigned to the related theme event 272, in which case the triggers for the theme content suggestions 274 will also be determined in step 2430.

In one embodiment, the user can select a theme and perform steps 2410-2430 on media organization server computer 180. In this embodiment, the theme suggestions 274 and related triggers will need to be downloaded to the mobile device 100 at step 2440. In other embodiments, the app 134 on the mobile device 100 will assist the user with steps 2410-2430. In these embodiments, the content suggestions 274 will already be found on the mobile device 100 and step 2440 can be skipped.

At step 2450, the mobile device 100 monitors the triggers associated with the content suggestions 274. If it is not the time or place for a suggestion 274 to trigger, step 2450 simply repeats. If a trigger is noted, step 2460 determines whether or not the triggered theme content suggestion 274 relates to the gathering of implicit content 138, or a notification to the user to gather explicit content 136. If the suggestion 274 relates to implicit content 138, the theme content suggestion 274 will identify or define a monitoring mode and start process 800 (step 2470 in FIG. 16). When process 800 has created the implicit content 138, step 2472 will associate the created content item 210 with the triggered theme content suggestion 274. Because each theme content suggestion 274 will contain information about the content that it is requesting, this information can be assigned to the metadata for the created content item 210 in step 2474. The process 2400 would then return to step 2450 to wait for the next suggested media content 274 to trigger.

If step 2460 determines that the triggered suggested media content 274 requires a request that the user gather explicit content 136, then step 2480 will provide a notification containing that request through the mobile device 100. As explained above, this notification may include an audible indicator or a vibration on the mobile device 100 as well as a written notification on display 110. In the preferred embodiment, these notifications are provided through the notification system provided by the operating system of the mobile device 100 (such as iOS or ANDROID). At step 2482, the mobile device 100 is monitored to see if any explicit content 136 is created within a preset time period of the notification provided in step 2480. If so, the mobile device 100 will make a tentative assignment within its media organization data 139 between this newly created content item 210 and the triggered theme content suggestion 274. In most embodiments, the user will be given the opportunity to verify this connection at step 2484. If the user rejects the assignment, then the assignment is deleted in media organization data 139 and the method returns to step 2450. If the user confirms the relationship between the newly created content item 210 and the triggered theme content suggestion 274, then the descriptive information found in database entity 274 is assigned to the metadata of the content item 210 in step 2474, and the method returns to step 2450 to await the next triggering event.

Figure 25:
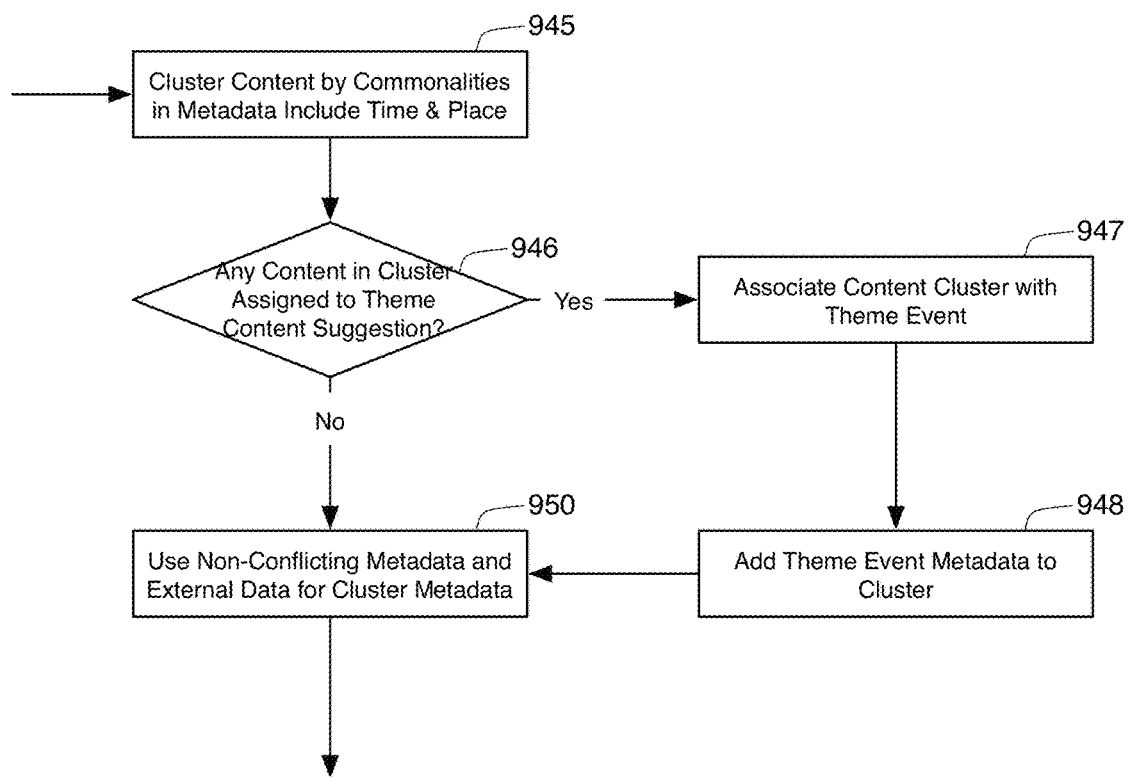
FIG. 25 is a portion of the flow chart shown in FIG. 9 modified to reflect theme assignments.

The use of themes 270, theme events 272, and theme content suggestions 274 can improve the content clustering process 900 described above in association with FIG. 9. In particular, FIG. 9 shows step 945 as clustering content by commonalities in the content metadata, including time and place metadata. As FIG. 25 shows, this process 900 can be improved by adding steps 946, 947, and 948 to process 900. FIG. 25 shows only that portion of process 900 that was changed using the theme related data, as the other portions of process 900 remain as shown in FIG. 9. In the improvement, clusters that are formed at step 945 are examined in step 946 to see if they contain any content items 210 that are associated with theme content suggestions 274. If so, step 947 associates the entire content cluster 947 with the theme event 272 associated with that theme content suggestion 1724. At step 948, metadata associated with the theme event 272 including a title or description (e.g. "Board Cruise Ship") is assigned to the cluster. The process 900 then returns to step 950 and continues as shown in FIG. 9.

Figure 26:
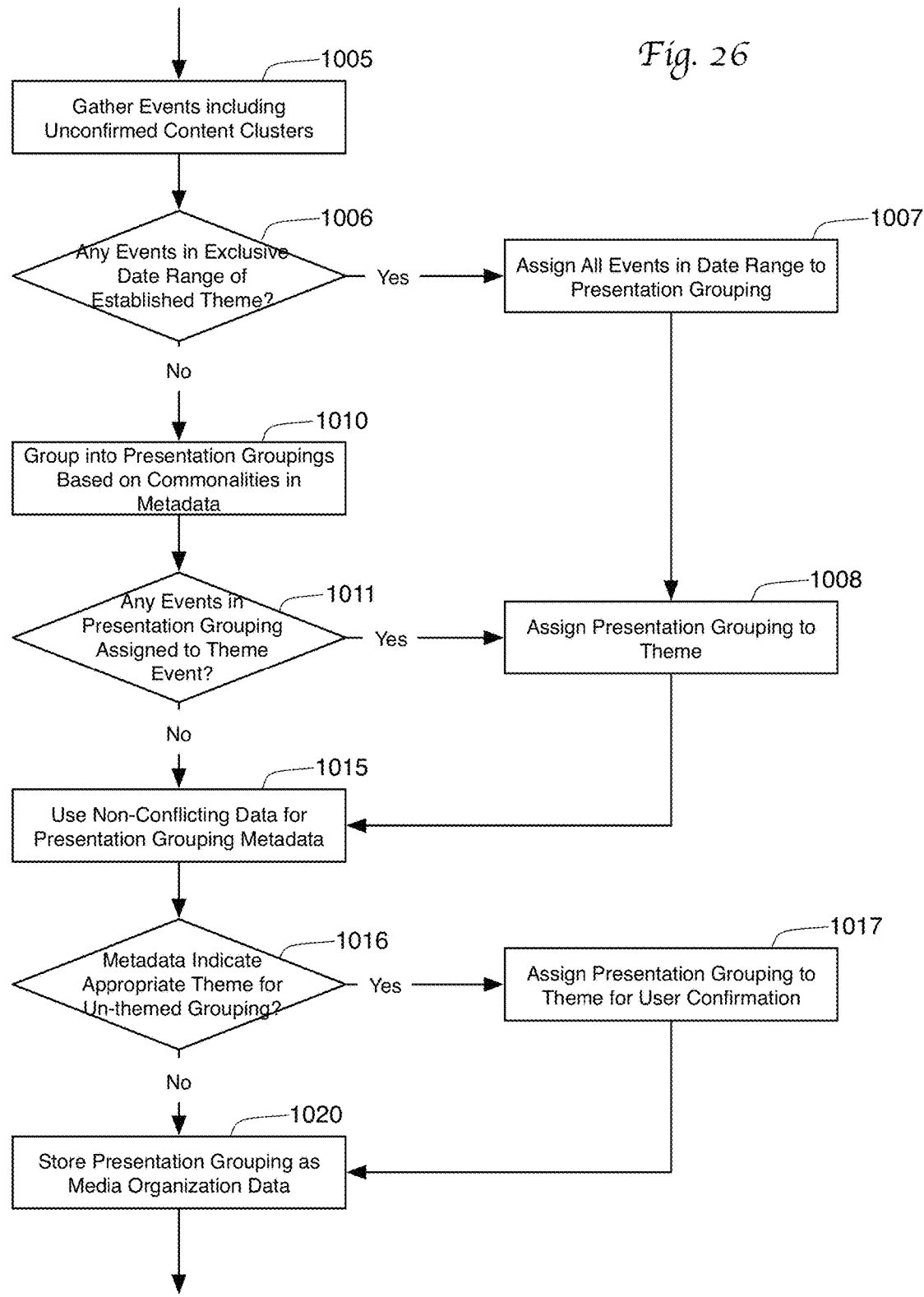
FIG. 26 is a portion of the flow chart shown in FIG. 10 modified to reflect theme assignments.

Similarly, FIG. 26 shows improvements to presentation grouping process 1000 shown in FIG. 10. In this case, after step 1005 gathers events 230 (including unconfirmed content clusters 220), step 1006 determines if any of the events 230 are within an exclusive date range of an established theme 270 for the current user. As described above in connection with element 2040 of interface 2000, the user can establish that all content acquired during a date range 2030 is to be assigned to the theme 270 (2010) and its associated presentation grouping 240. If so, then step 1007 assigns all of these events 230 to a single presentation grouping 240 and then, in step 1008, assigns that presentation grouping to the appropriate theme 270. If step 1007 determines that a presentation grouping 240 is already associated with the appropriate theme 270, the events 230 will simply be assigned to that existing presentation grouping 240 and step 1008 can be skipped as unnecessary.

If step 1006 did not find any events 230 within the date range 2030 of an established theme 270, then step 1010 will continue to group these items 220, 230 into presentation groupings 240 based on commonalities in the metadata 1010. When the user establishes one or more themes 270, the data retained about these themes 270 can assist process 1000 in this step 1010. For example, a user may establish a themed presentation grouping 240 about his model railroad hobby. This presentation grouping 240 includes a variety of temporally sparse events 230 that happen to occur at a common location. The theme 270 associated with this grouping 240 may be assigned geographic areas of interest as well as persons of interest. Step 1010 can recognize these elements when assigning events 230 into presentation groupings 240, which will bias the assignment of a content cluster 220 or event 230 that shares these elements to this themed presentation grouping 240. At step 1011, the events 230 within the presentation grouping 240 are analyzed to determine if any of the events 230 are currently associated with a theme event 272 in database 200. If so, the presentation grouping 240 may be assigned to the appropriate theme in step 1008. In some embodiments, events 230 can be associated with a plurality of presentation groupings 240. For instance, a photograph of a couple on a cruise can be included in the "Caribbean cruise" presentation grouping 240 as well as a "romantic moments" presentation grouping 240. In these embodiments, it may be inappropriate to assign an entire presentation grouping 240 to a theme 270 simply because one of the events 230 is associated with a theme event 272, so step 1011 (and 1008) would be skipped.

At step 1015, non-conflicting metadata for the events is used to create metadata for the presentation group 240. At step 1016, this metadata is analyzed and compared to the pre-defined themes 270 to see if this presentation grouping 240 may be appropriate for association with one of the themes 270. Of course, step 1016 will only perform this analysis if the presentation grouping 240 is not currently assigned to any theme 270. If step 1016 does find an appropriate theme, step 1017 assigns the theme 270 to the presentation grouping 240, thereby allowing the formatting instructions 280 associated with the theme 270 to be used to present the presentation grouping 240. Once a theme 270 is assigned to the presentation grouping 240, the user can assist in the assignment of existing events 230 within the presentation grouping 240 with theme events 272 for the defined theme 270, and the assignment of content items 210 to suggested theme content 274. User input may also indicate that the assignment made in step 1017 is inappropriate, in which case the assignment would be removed from the database 200. Also, as explained above, a user is free to manually assign their existing presentation groupings 240 to the predefined themes 270 whenever they see fit. If the step 1016 did not find a match between the metadata of the presentation grouping 240 and a theme 270, or in any case after step 1017, step 1020 stores the presentation grouping 240 on the mobile device 100 as media organization data 139 and/or as user content 186 in the media organization server 180.

The many features and advantages of the invention are apparent from the above description. Numerous modifications and variations will readily occur to those skilled in the art. Since such modifications are possible, the invention is not to be limited to the exact construction and operation illustrated and described. Rather, the present invention should be limited only by the following claims.

What is claimed is:

1. A method for organizing media content items comprising:
   a) on a computerized processor, accessing media content items stored on a tangible, non-transitory computer memory;
   b) analyzing, using the processor, time metadata for the media content items to find commonalities in the time metadata;
   c) clustering, using the processor, the media content items into a first content cluster without user involvement, the clustering being based upon commonalities in the time metadata;
   d) creating a crowd-sourced event database containing a plurality of calendar event data items by:
      i) receiving a plurality of content clusters from a plurality of users, the plurality of content clusters each comprising an identification of a plurality of media content items, time metadata, and description metadata,
      ii) extracting the time metadata and description metadata from the content clusters, and
      iii) creating calendar event data items from the time metadata and description metadata extracted from the content clusters;
   e) identifying, using the processor, a related calendar event data item based on commonalities between the time metadata of the first content cluster and time information of the related calendar event data item, wherein this step further comprises:
      i) identifying, using the processor, a particular user associated with the media content items of the first content cluster,
      ii) filtering the calendar event data items into a filtered subset of calendar event data items that are relevant to the particular user, wherein at least calendar event data items in the filtered subset was created by a user other than the particular user, and
      iii) comparing the filtered subset of calendar event data items with the time metadata of the first content cluster; and f) assigning description metadata from the related calendar event data item to description metadata for the first content cluster.

2. The method of claim 1, further comprising:
g) accessing an organization and user database containing a plurality of organization data items, each organization data item being associated with a plurality of user data items, wherein each of the calendar event data items in the crowd-sourced event database is associated with one user data item.

3. The method of claim 2, wherein the particular user is associated with a particular user data item, further wherein the step of filtering the plurality of calendar event data items is accomplished by:
 (1) identifying a particular organization data item associated with the particular user data item; and
 (2) filtering the calendar event data items based on whether the calendar event data items are associated with user data items that are in turn associated with the particular organization data item.

4. The method of claim 1, wherein the media content items contain location metadata, wherein the step of clustering is further based on commonalities in the location metadata, further wherein the filtered subset of calendar event data items is also compared against the location metadata of the first content cluster.

5. A method for organizing media content items comprising:
a) on a computerized processor, accessing media content items stored on a tangible, non-transitory computer memory;
b) analyzing, using the processor, time metadata for the media content items to find commonalities in the time metadata;
c) clustering, using the processor, the media content items into a first content cluster without user involvement, the clustering being based upon commonalities in the time metadata;
d) accessing an organization and user database containing a plurality of organization data items, each organization data item being associated with a plurality of user data items, wherein a particular user is associated with a particular user data item;
e) accessing an organization event database containing a plurality of calendar event data items with each calendar event data item being associated with a sponsoring organization data item;
f) identifying, using the processor, a related calendar event data item based on commonalities between the time metadata of the first content cluster and time information of the related calendar event data item, wherein this step further comprises:
 i) identifying, using the processor, that the particular user is associated with the media content items of the first content cluster,
 ii) filtering the calendar event data items into a filtered subset of calendar event data items that are relevant to the particular user; further wherein the step of filtering the plurality of calendar event data items is accomplished by:
  (1) identifying a particular organization data item associated with the particular user data item,
  (2) filtering the calendar event data items based on whether the calendar event data items are associated with the particular organization data item, and
 iii) comparing the filtered subset of calendar event data items with the time metadata of the first content cluster; and
g) assigning description metadata from the related calendar event data item to description metadata for the first content cluster.

6. The method of claim 5, wherein the step of identifying the related calendar event data item further comprises:
 iv) identifying a plurality of relevant calendar event data items during the comparison of the filtered subset of calendar items,
 v) ranking the plurality of relevant calendar event data items based on a source identified for each relevant calendar event data items, and
 vi) identifying a highest ranked of the plurality of relevant calendar event data items as the related calendar event data item.

7. The method of claim 6, wherein
(1) calendar event data items created by the particular user are ranked highest;
(2) calendar event data items associated with an organization that in turn is associated with the particular user are ranked second; and
(3) calendar event data items not created by the particular user and not associated with the organization associated with the particular user are ranked third.

* * * * *